(12) United States Patent
Mastie et al.

(10) Patent No.: US 9,186,987 B2
(45) Date of Patent: Nov. 17, 2015

(54) ELECTRO-MECHANICAL TRANSFER CASE WITH RANGE SHIFT ON THE MOVE

(71) Applicants: Joseph D. Mastie, Belleville, MI (US);
Larry A. Pritchard, Macomb, MI (US);
David Young, Royal Oak, MI (US);
Donn Niffenegger, Warren, MI (US);
Christopher Kurmaniak, Clarkston, MI (US)

(72) Inventors: Joseph D. Mastie, Belleville, MI (US);
Larry A. Pritchard, Macomb, MI (US);
David Young, Royal Oak, MI (US);
Donn Niffenegger, Warren, MI (US);
Christopher Kurmaniak, Clarkston, MI (US)

(73) Assignee: BorgWarner, Inc., Aunurn Hills, MI (US)

( * ) Notice: Subject to any disclaimer, the term of this patent is extended or adjusted under 35 U.S.C. 154(b) by 0 days.

(21) Appl. No.: 14/623,017

(22) Filed: Feb. 16, 2015

(65) Prior Publication Data

US 2015/0158383 A1     Jun. 11, 2015

Related U.S. Application Data

(63) Continuation-in-part of application No. 14/561,740, filed on Dec. 5, 2014.

(60) Provisional application No. 62/077,957, filed on Nov. 11, 2014, provisional application No. 62/012,443, filed on Jun. 16, 2014, provisional application No. 61/914,161, filed on Dec. 10, 2013.

(51) Int. Cl.
*B60K 17/354* (2006.01)
*B60K 17/346* (2006.01)
*B60K 17/35* (2006.01)
*F16H 61/04* (2006.01)
*F16H 63/30* (2006.01)

(52) U.S. Cl.
CPC ............. *B60K 17/3467* (2013.01); *B60K 17/35* (2013.01); *F16H 61/0403* (2013.01); *F16H 63/304* (2013.01)

(58) Field of Classification Search
None
See application file for complete search history.

(56) References Cited

U.S. PATENT DOCUMENTS

| 1,983,834 | A |   | 12/1934 | Barnes |            |
|-----------|---|---|---------|--------|------------|
| 4,664,217 | A | * | 5/1987  | Welch et al. | 180/247 |
| 4,721,194 | A | * | 1/1988  | Frost  | 192/48.91  |
| 5,076,112 | A | * | 12/1991 | Williams | 74/337.5 |

(Continued)

FOREIGN PATENT DOCUMENTS

| EP | 187117 B1 | 4/1989 |
|----|-----------|--------|
| EP | 741054 B1 | 7/2002 |

(Continued)

*Primary Examiner* — Dirk Wright
(74) *Attorney, Agent, or Firm* — Helmholdt Law PLC; Thomas D. Helmholdt

(57) ABSTRACT

A transfer case (21, 330) and a method of assembly can include an input shaft (15) and output shafts (14, 16), a mode clutch (30) for shifting between a two-wheel and four-wheel drive mode, a mode shift mechanism (56, 380, 480), a planetary gear assembly (20) for providing a different drive ratio between the input shaft (15) and the output shaft (14), a range shift mechanism (50, 360, 460), and a synchronizer (40, 340) for speed synchronization before shifting between a low-range drive mode and a high-range drive mode. A fixed ring gear (24) can be connected to the planetary gear assembly (20) during the high-range and low-range drive mode. The mode shift mechanism (56) and the range shift mechanism (50) can be electro-mechanically actuated by a reversible rotatable actuating gear (348, 448) interposed between an expandable clutch actuator (388, 488) and a rotatable barrel cam (359, 459).

17 Claims, 13 Drawing Sheets

(56) References Cited

U.S. PATENT DOCUMENTS

| | | | |
|---|---|---|---|
| 5,105,902 A * | 4/1992 | Wilson et al. | 180/247 |
| 5,346,442 A * | 9/1994 | Eastman | 475/223 |
| 5,597,369 A | 1/1997 | Brissenden et al. | |
| 5,699,870 A * | 12/1997 | Warren | 180/247 |
| 5,711,740 A * | 1/1998 | Bakowski | 475/303 |
| 5,782,331 A | 7/1998 | Bailly et al. | |
| 5,836,847 A | 11/1998 | Pritchard | |
| 5,845,754 A | 12/1998 | Weilant | |
| 5,911,644 A * | 6/1999 | Williams | 475/295 |
| 6,022,289 A | 2/2000 | Francis | |
| 2,056,666 A | 5/2000 | Williams | |
| 6,413,184 B1 * | 7/2002 | Yoshimura | 475/204 |
| 6,464,608 B2 | 10/2002 | Bowen et al. | |
| 6,579,205 B2 | 6/2003 | Williams | |
| 6,602,159 B1 * | 8/2003 | Williams | 475/303 |
| 6,645,110 B2 | 11/2003 | Williams et al. | |
| 6,779,641 B2 | 8/2004 | Vonnegut et al. | |
| 6,780,134 B2 | 8/2004 | Vonnegut et al. | |
| 6,808,053 B2 | 10/2004 | Kirkwood et al. | |
| 6,814,682 B2 | 11/2004 | Spitale | |
| 6,821,227 B2 | 11/2004 | Williams | |
| 6,878,088 B2 | 4/2005 | Williams | |
| 6,905,436 B2 | 6/2005 | Mueller et al. | |
| 6,945,375 B2 | 9/2005 | Kirkwood et al. | |
| 6,991,080 B2 | 1/2006 | Puiu | |
| 7,004,875 B2 | 2/2006 | Williams et al. | |
| 7,081,064 B2 | 7/2006 | Mueller et al. | |
| 7,111,716 B2 | 9/2006 | Ekonen et al. | |
| 7,128,686 B2 | 10/2006 | Hitch et al. | |
| 7,150,694 B2 | 12/2006 | Mizon et al. | |
| 7,229,378 B2 | 6/2007 | Mueller et al. | |
| 7,255,213 B2 | 8/2007 | Tsukada et al. | |
| 7,258,213 B2 | 8/2007 | Ekonen et al. | |
| 7,278,943 B2 | 10/2007 | Puiu | |
| 7,278,947 B2 | 10/2007 | Puiu | |
| 7,383,931 B2 | 6/2008 | Giese et al. | |
| 7,399,231 B2 | 7/2008 | Glimpel et al. | |
| 7,631,719 B2 | 12/2009 | Wenthen | |
| 7,650,808 B2 | 1/2010 | Mizon et al. | |
| 8,079,928 B2 | 12/2011 | Ronk et al. | |
| 8,235,860 B2 * | 8/2012 | Williams | 475/299 |
| 8,316,738 B2 | 11/2012 | Hellinger et al. | |
| 8,393,241 B2 | 3/2013 | Akkerman et al. | |
| 8,402,859 B2 * | 3/2013 | Neelakantan et al. | 74/473.36 |
| 8,511,451 B2 | 8/2013 | Ledetzky et al. | |
| 8,622,164 B2 * | 1/2014 | Takaira | 180/247 |
| 8,863,928 B2 | 10/2014 | Echtler et al. | |
| 2003/0211913 A1 | 11/2003 | Spitale | |
| 2003/0224894 A1 | 12/2003 | Vonnegut et al. | |
| 2005/0101429 A1 * | 5/2005 | Allen et al. | 475/223 |
| 2008/0129230 A1 | 6/2008 | Schepperle et al. | |
| 2013/0263684 A1 * | 10/2013 | McCloy | 74/473.36 |

FOREIGN PATENT DOCUMENTS

| | | |
|---|---|---|
| GB | 878366 A | 9/1961 |
| JP | 2001213182 A | 8/2001 |
| JP | 2007050790 A | 3/2007 |
| JP | 2010076748 A | 4/2010 |
| WO | 2007092328 A2 | 8/2007 |

* cited by examiner

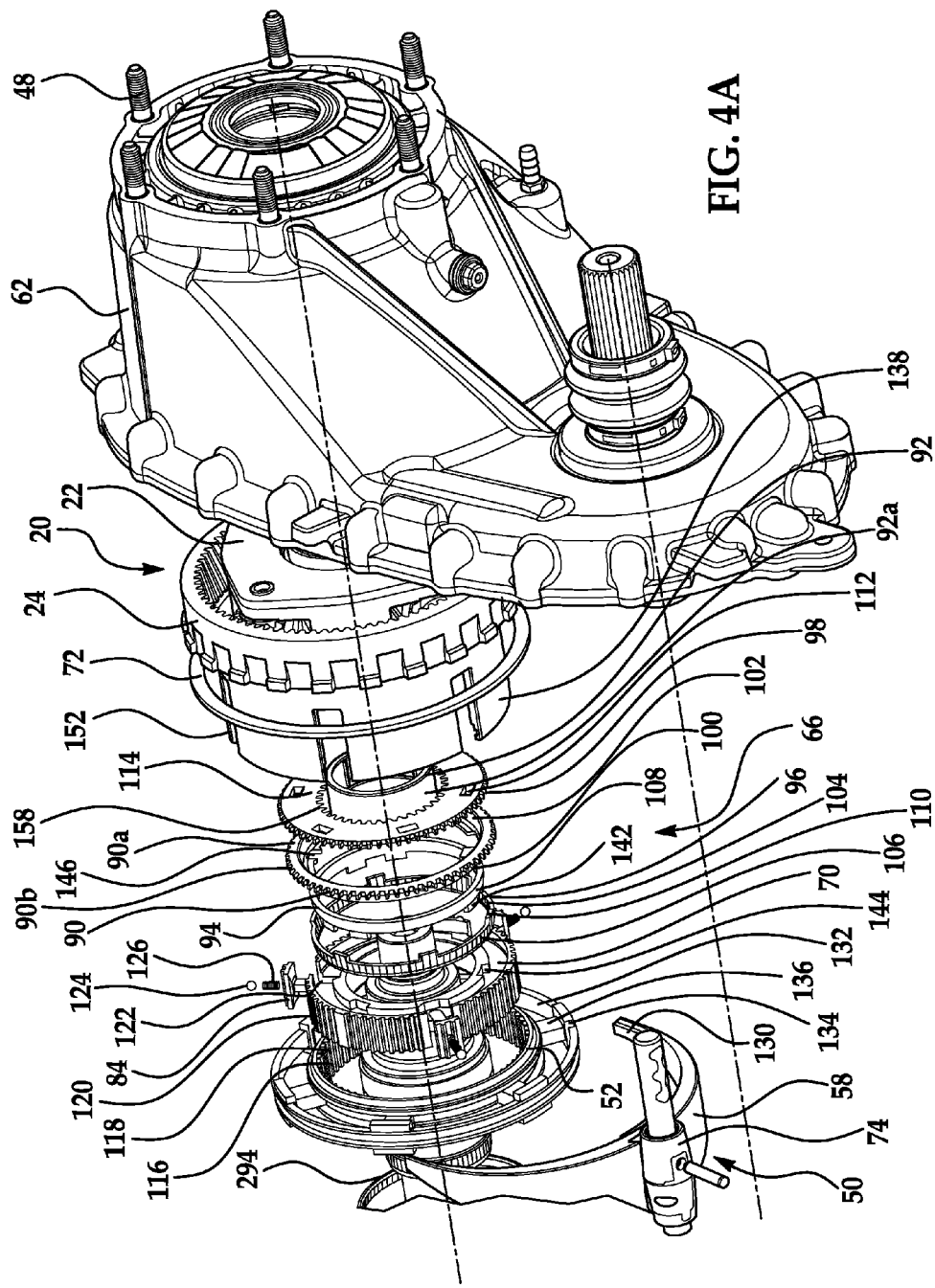

ELECTRO-MECHANICAL TRANSFER CASE WITH RANGE SHIFT ON THE MOVE

RELATED APPLICATIONS

This application is a continuation in part of U.S. patent application Ser. No. 14/561,740 filed Dec. 5, 2014, claiming priority to U.S. Provisional Patent Application No. 61/914,161 filed Dec. 10, 2013, and also claims priority to U.S. Provisional Patent Application No. 62/012,443 filed Jun. 16, 2014 and U.S. Provisional Patent Application No. 62/077,957 filed Nov. 11, 2014, which are all incorporated by reference herein in their entirety.

FIELD OF THE INVENTION

The invention relates to a range shift synchronizer for use in a four-wheel drive motor vehicle transfer case having electro-mechanical actuation.

BACKGROUND

There is a desire to provide an electro-mechanically actuated transfer case having a mode shift mechanism, clutch assembly, and synchronizer in order to selectively and more efficiently direct drive torque from the powertrain to wheels of a vehicle.

SUMMARY

To overcome the limitation of current technology, a transfer case for a four-wheel drive vehicle can include a simple planetary gear assembly. The output shaft can be driven by the sun gear during a high-range drive mode and driven by the planetary gear carrier during a low-range drive mode, eliminating driving the output shaft through the planetary gears in high-range drive mode. The transfer case can include a ring gear non-rotatably mounted with respect to the planetary gear assembly and fixed during the high-range drive mode and the low-range drive mode. The transfer case can include a synchronizer mounted to the output shaft and adjacent the planetary gear assembly, rather than within the planetary gear assembly, thereby enabling a greater number of friction surfaces and/or greater friction surface areas for faster speed synchronization of rotating components within the transfer case. The four-wheel drive vehicle can also include an electro-mechanical transfer case having an electric motor, planetary gear assembly, modular actuation, and an outer cone synchronizer enabling a driver to shift between the high-range drive mode and the low-range drive mode while driving.

A transfer case for a four-wheel drive vehicle can include an input shaft rotatably driven by an engine and located along a longitudinal axis, and a first and second output shaft providing transfer of power to a front driveline and a rear driveline. The first output shaft can be located generally coaxial with respect to the longitudinal axis of the input shaft. The transfer case can include a planetary gear assembly operable for providing a different drive ratio between the input shaft and the first output shaft and including a sun gear fixed to the input shaft, a stationary ring gear, and a planetary gear carrier supporting planetary gears for rotation intermeshed between the sun gear and the ring gear. The transfer case can include a mode clutch located along the longitudinal axis for shifting between a two-wheel drive mode and a four-wheel drive mode.

The transfer case can include a range shift mechanism operable for shifting the transfer case between a high-range drive mode and a low-range drive mode. The first output shaft can be driven by the sun gear during the high-range drive mode and driven by the planetary gear carrier during the low-range drive mode. The ring gear can be fixed in a stationary position with respect to the planetary gear assembly during the high-range drive mode and the low-range drive mode. The transfer case can include a synchronizer connected to the first output shaft and located adjacent the planetary gear assembly along the longitudinal axis. The synchronizer can be operable for speed synchronization of rotating input and output components before selectively connecting the first output shaft with the sun gear during the high-range drive mode and with the planetary gear carrier during the low-range drive mode. The transfer case can include a mode shift mechanism located adjacent the range shift mechanism along the longitudinal axis and axially moveable for engaging and disengaging the mode clutch.

The transfer case can include a clutch actuator operably interacting with an actuating gear axially interposed between the range shift mechanism and the mode shift mechanism, and a barrel cam connected for rotation in response to rotation of the actuating gear. The barrel cam selectively operating the clutch actuator, synchronizer, and the range shift mechanism in response to reversible angular rotation of the barrel cam through predetermined angular arcs by the actuating gear. The clutch actuator can be moveable between an expanded position and a contracted position for disengaging and engaging the mode clutch in response to reversible angular rotation of the barrel cam through predetermined angular arcs at either longitudinal end of movement of the range shift mechanism. The actuating gear can be reversibly rotatable through predetermined angular arcs of movement for operating the clutch actuator between the contracted position and the expanded position for actuating the mode clutch between a disengaged position and an engaged position, and for shifting the range shift mechanism between the low-range drive mode and the high-range drive mode including operation of the synchronizer, when the mode clutch is in the disengaged position. The barrel cam can define a cam surface groove located on an internal peripheral surface having longitudinal end portions extending circumferentially and an intermediate portion extending longitudinally and circumferentially between the end portions of the cam surface groove. Each end portion can correspond to one of the low-range drive mode and the high-range drive mode and allow actuation of the clutch actuator while in one of the low-range drive mode and the high-range drive mode. The intermediate portion can correspond to shifting between the low-range drive mode and the high-range drive mode including operation of the synchronizer, while the mode clutch is disengaged A method for assembling a transfer case can be provided, where the transfer case can include an input shaft rotatably driven by an engine and located along a longitudinal axis, and a first output shaft and a second output shaft for transferring power to a front driveline and a rear driveline. The transfer case can include a planetary gear assembly providing a different drive ratio between the input shaft and the first output shaft and including a sun gear fixed to the input shaft, a stationary ring gear, and a planetary gear carrier supporting a plurality of planetary gears for rotation intermeshed between the sun gear and the ring gear. The transfer case can include a mode clutch located along the longitudinal axis for shifting between a two-wheel drive mode and a four-wheel drive mode. The method can include inserting a range shift mechanism for shifting the transfer case between a high-range drive mode and a low-range drive mode. The first output shaft can be driven by the sun gear during the high-range drive mode and driven by the planetary gear carrier during the low-range drive mode. The method can include mounting the ring gear fixed or grounded non-rotatably with respect to the planetary gear assembly. The ring gear can be fixed in a stationary position during the high-range drive mode and the low-range drive mode. The method can include mounting a synchronizer to the first output shaft and adjacent the planetary gear assembly along the longitudinal axis. The synchronizer can be operable for speed synchronization of input and output components before drivingly connecting the first output shaft with the sun gear during the high-range drive mode and with the planetary gear carrier during the low-range drive mode. The method can include inserting a mode shift mechanism adjacent the range shift mechanism along the longitudinal axis. The mode shift mechanism can be axially moveable for engaging and disengaging the mode clutch.

The method of assembling can include forming a cam surface groove on a barrel cam. The cam surface groove located on an internal peripheral surface and having longitudinal end portions extending circumferentially and an intermediate portion extending longitudinally and circumferentially between the end portions of the cam surface groove. Each end portion of the cam surface groove can correspond to one of the low-range drive mode and the high-range drive mode and allow actuation of the clutch actuator while in one of the low-range drive mode and the high-range drive mode. The intermediate portion of the cam surface groove can correspond to shifting between the low-range drive mode and the high-range drive mode including operation of the synchronizer, while the mode clutch is disengaged. The barrel cam selectively operating the clutch actuator, synchronizer, and the range shift mechanism in response to reversible angular rotation of the barrel cam through predetermined angular arcs by an actuating gear. The actuating gear can be driven in rotation by a reversible electric motor. The actuating gear can rotate through predetermined angular arcs of movement for rotating the barrel cam to operate the clutch actuator between the contracted position and the expanded position for actuating the mode clutch between a disengaged position and an engaged position, and for shifting the range shift mechanism between the low-range drive mode and the high-range drive mode including operation of the synchronizer, when the mode clutch is in the disengaged position Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 4A is a detailed view of the synchronized range shift mechanism of FIG. 3 showing a first synchronizer assembly and a planetary gear assembly;

DETAILED DESCRIPTION

Referring to FIGS. 1-13B, a four-wheel drive vehicle can include a powertrain for selectively transferring power through a transmission from a source of power, such as an engine. The powertrain can include a front driveline, a rear driveline, and a transfer case 21, 310 arranged to transmit drive torque from the transmission to the front driveline and the rear driveline. The front driveline can include a pair of front wheels adjoined by a front axle assembly having a front differential coupled to one end of a front driveshaft. The opposing end of the front driveshaft can be coupled to one of a first output shaft 14 and a second output shaft 16 of the transfer case 21, 310. The rear driveline can include a pair of rear wheels adjoined by a rear axle assembly having a rear differential coupled to one end of a rear driveshaft. The opposing end of the rear driveshaft can be coupled to one of the first and second output shafts 14, 16 of the transfer case 21, 310.

Figure 1:
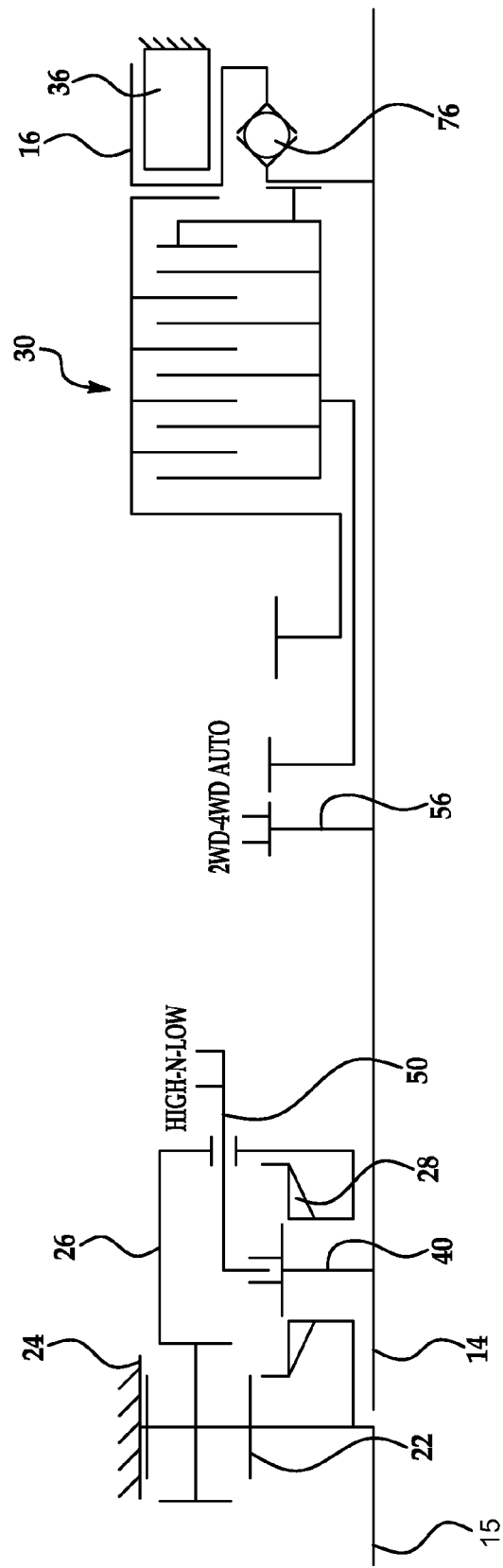
FIG. 1 is a schematic showing a synchronizer and planetary gear assembly located adjacently on an output shaft in a transfer case.
Figure 2:
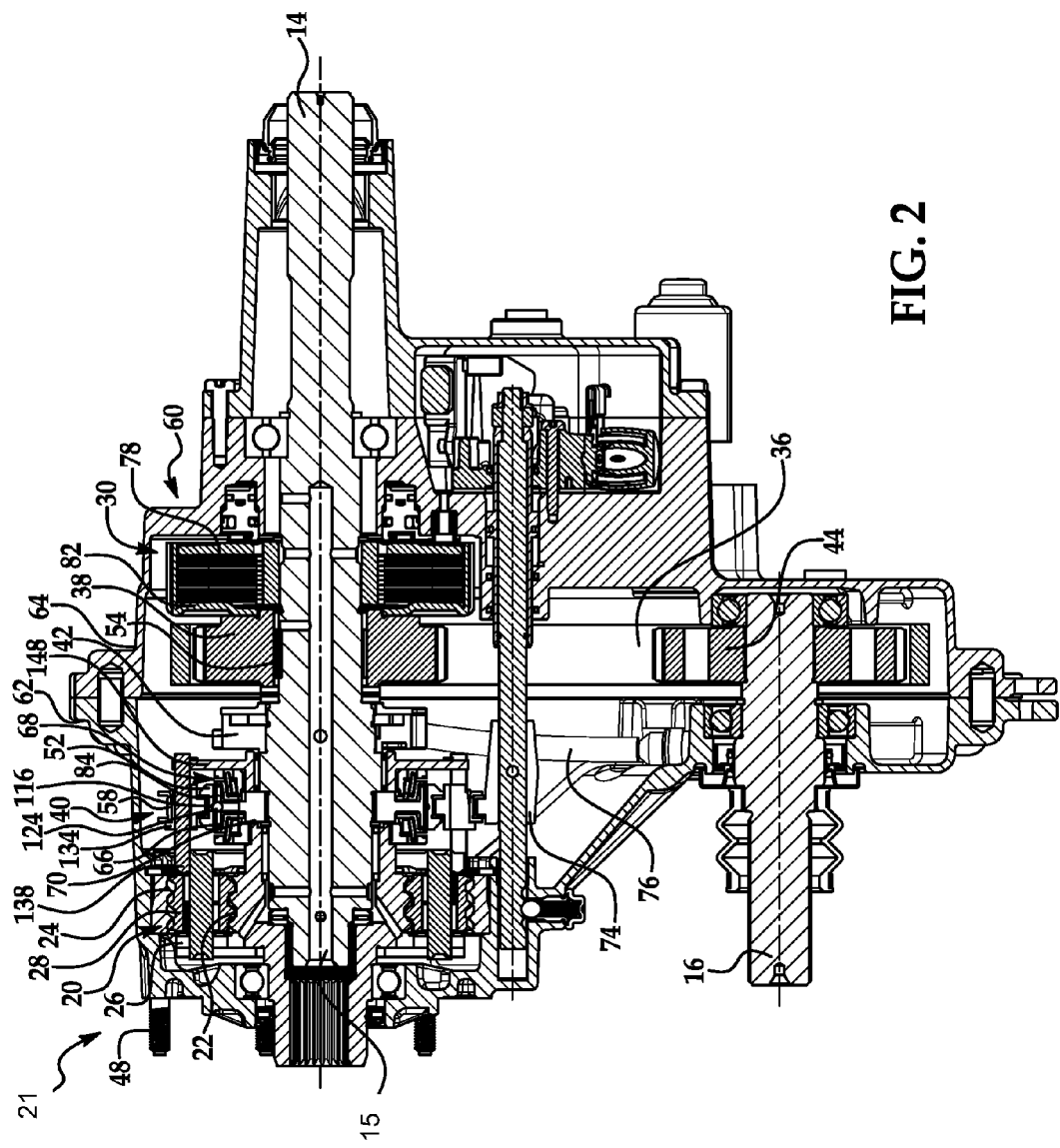
FIG. 2 is a sectional view of the transfer case of FIG. 1.

With particular reference to FIGS. 2-4B, a transfer case 21 can include a housing assembly 60 having a first housing section 62 and a second housing section 64 interconnected to one another by a plurality of threaded bolts 48. The first housing section 62 can receive a transmission output shaft attached with a splined connection to an input shaft 15 for the transfer case 21, such that the transmission output shaft and the input shaft 15 can be rotatably driven by the engine at a gear ratio established by the transmission. The input shaft 15 can be rotatable about a longitudinal axis and can also rotatably drive a gear reduction unit, or planetary gear assembly 20, at a predetermined speed ratio. As best illustrated in FIGS. 1-2, the planetary gear assembly 20 can drive the first output shaft 14, such that the first output shaft 14 can be coupled for rotation with the input shaft 15 or driven for rotation with the planetary gear assembly 20.

As illustrated in FIGS. 1-4B, the transfer case 21 can include a range shift mechanism 50 that can be operable with the planetary gear assembly 20 for shifting between a high-range drive mode and a low-range drive mode. As best illustrated in FIGS. 1-2, the planetary gear assembly 20 can include a sun gear 22 integrally fixed to the input shaft 15, a ring gear 24 non-rotatably fixed to the first housing section 62, and a planetary gear carrier 26 supporting a plurality of planetary gears 28 intermeshed between the sun gear 22 and the ring gear 24. Each of the plurality of planetary gears 28 can be rotatably supported on a pinion shaft connected to the planetary gear carrier 26. A snap ring 72 can retain the ring gear 24 from axial movement. The planetary gear assembly 20 can include helical gears if desired. In the high-range drive mode, the sun gear 22 can rotably drive the first output shaft 14 at a direct speed ratio relative to the input shaft 15. In the low-range drive mode, the planetary gear carrier 26 can rotatably drive the first output shaft 14 at a reduced speed ratio relative to the input shaft 15. It is contemplated that the range shift mechanism 50 can additionally shift to a neutral non-driven mode. In the neutral mode, the driven connection between the input shaft 15 and the first output shaft 14 is interrupted. As illustrated in FIG. 2, a mode clutch 30 can be located on the first output shaft 14. The mode clutch 30 can be operable for selectively shifting between a two-wheel drive mode and a four-wheel drive mode. The mode clutch 30 can be operable for preventing undesirable gear tooth clash or shift blocking that can occur during a range shift. As best illustrated in FIG. 2, the first output shaft 14 can be rotatably supported in the housing assembly 60 and coaxially aligned along the longitudinal axis of the input shaft 15.

Figure 3:
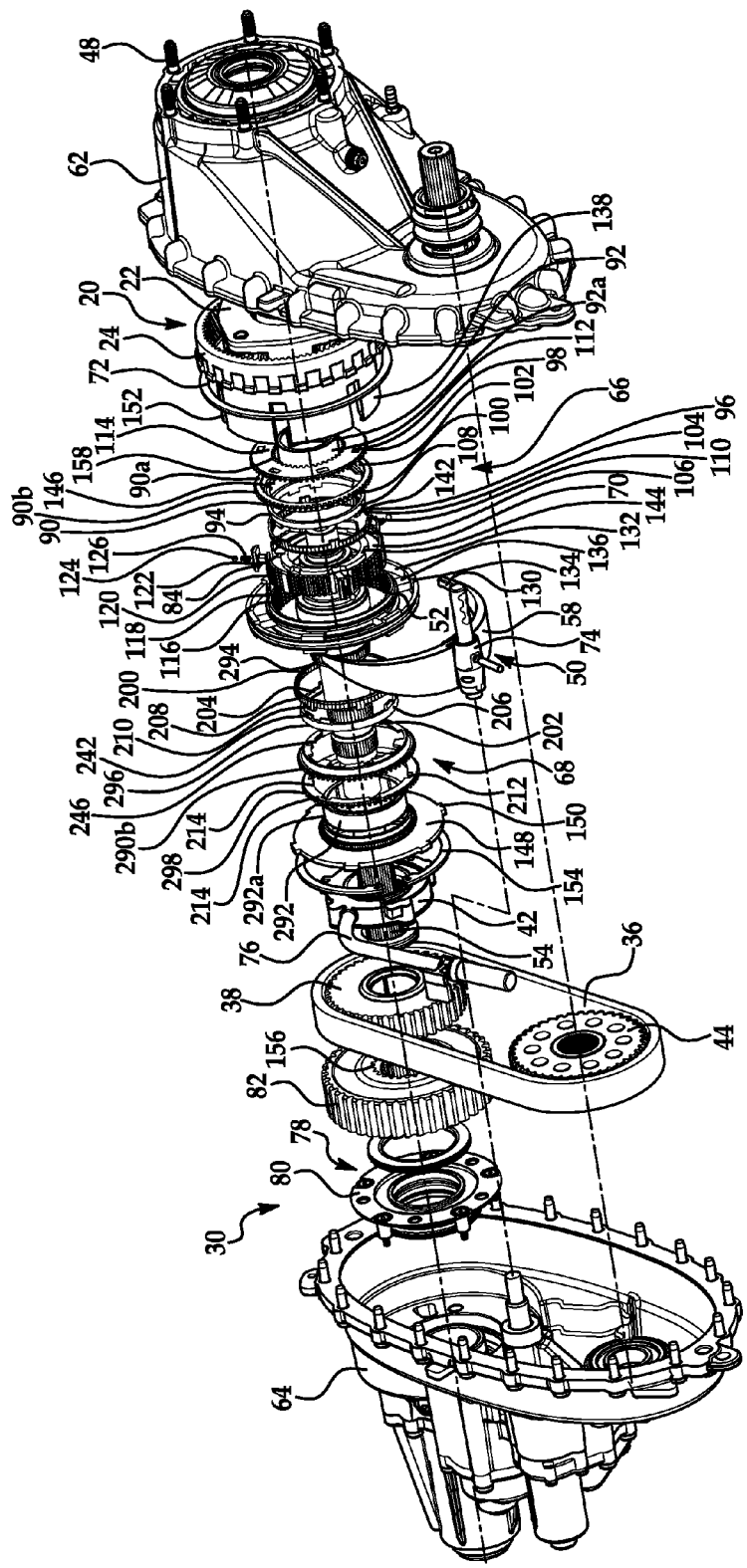
FIG. 3 is an exploded view of a synchronized range shift mechanism of the transfer case of FIG. 1.

As illustrated in FIGS. 2-4A, the first housing section 62 can receive the planetary gear assembly 20 and a synchronizer 40. The synchronizer 40 can be fixed to the first output shaft 14 along the longitudinal axis and located adjacent the planetary gear assembly 20. The synchronizer 40 can be interposed between the planetary gear assembly 20 and the mode clutch 30 and can be operable for speed synchronization of rotating input and rotating output components before drivingly connecting the first output shaft 14 with the sun gear 22 during the high-range drive mode and with the planetary gear carrier 26 during the low-range drive mode. The synchronizer 40 can provide speed synchronization of the first output shaft 14 with the input shaft 15 and the sun gear 22 when the first output shaft 14 is connected to the sun gear 22 during the high-range drive mode. The synchronizer 40 can also provide speed synchronization of the first output shaft 14 and the planetary gear carrier 26 when the first output shaft 14 is connected to the planetary gear carrier 26 during the low-range drive mode. The synchronizer 40 can include a synchronizer hub 70 and a range shift mechanism 50. The range shift mechanism 50 can include a shift sleeve 52 and a shift fork 58. The shift sleeve 52 can have a diameter greater than a diameter of the synchronizer hub 70 and can be axially slideable on the synchronizer hub 70. The synchronizer hub 70 can be coupled to the first output shaft 14. The shift sleeve 52 can have an inner spline surface 118 for coupling with an outer spline surface 120 located on the synchronizer hub 70. As best illustrated in FIGS. 3-4A, the synchronizer hub 70 can include a plurality of recesses 122 equally spaced concentrically about the synchronizer hub 70. The plurality of recesses 122 can receive a corresponding plurality of struts 84 normally biased radially outward from the longitudinal axis by a plurality of biasing members. The plurality of struts 84 can be received in the plurality of recesses 122 during axial movement of the shift sleeve 52 where the shift sleeve can be axially slideable on the synchronizer hub 70. The plurality of struts 84 can include splined surfaces 128 for engagement with the inner spline surface 118 of the shift sleeve 52. The biasing members can include balls 124 and a compression spring 126 assembly. The shift sleeve 52 can include a plurality of detents 116 for receiving the balls 124 within the inner spline surface 118 such that the compression spring 126 assembly can bias the plurality of struts 84 radially inward toward the longitudinal axis and the balls 124 radially outward against the plurality of detents 116. The balls 124 lock the plurality of struts 84 to the shift sleeve 52, such that the synchronizer hub 70 is locked and the shift sleeve 52 is prevented from shifting axially. The compression spring 126 can have at least one fixed end located within the recess 122. The shift sleeve 52 can be axially fixed in a neutral drive mode for maintaining the high-range drive mode and the low-range drive mode. When the compression spring 126 is compressed, the plurality of recesses 122 can receive the plurality of struts 84 such that the outer spline surface 120 of the synchronizer hub 70 and the splined surfaces 128 on the plurality of struts 84 can form a meshing surface with the inner spline surface 118 of the shift sleeve 52 and the shift sleeve 52 can axially shift across the synchronizer hub 70 for shifting between the high-range drive mode and the low-range drive mode. When the plurality of detents 116 capture the balls 124 in response to the biasing force of compression spring 126, the plurality of struts 84 and synchronizer hub 70 can provide a coupling with the inner spline surface 118 of the shift sleeve 52, such that the plurality of struts 84, synchronizer hub 70, and shift sleeve 52 can rotate concurrently.

As best illustrated in FIG. 3, the synchronizer 40 can include a first and second synchronizer assembly 66, 68 including a corresponding first and second blocker ring 90, 290, respectively, for preventing shift change until speed synchronization of the first output shaft 14 with the sun gear 22 or the planetary gear carrier 26. The first blocker ring 90 can prevent driving connection between the sun gear 22 and the first output shaft 14 until the first output shaft 14 and the input shaft 15 are rotating at a common speed. The first blocker ring 90 can include a radial flange section 90a having external teeth 90b adapted for engagement through the inner spline surface 118 of the shift sleeve 52 in response to speed synchronization in the high-range drive mode. The synchronizer 40 can include a first synchronizer assembly 66 having a cone shaped body 92, an outer cone ring 96, and an inner cone ring 94. The first synchronizer assembly 66 can be of a triple cone type and can include three cone surfaces and three mating friction blocking surfaces for detecting speed synchronization. The cone 92 can have a first cone surface 92a. The inner cone ring 94 can have a second cone surface 100 on an interior surface. The first blocker ring 90 can have a third cone surface 102. The outer cone ring 96 can have a first blocking surface 104 on an interior surface engageable with the first cone surface 92a. The outer cone ring 96 can have a second blocking surface 106 on an exterior surface engageable with the second cone surface 100. The inner cone ring 94 can have a third blocking surface 108 on an exterior surface engageable with the third cone surface 102. The use of multiple cone surfaces and blocking surfaces can provide for faster speed synchronization of the rotating components. In assembly, the inner cone ring 94 can include a plurality of cone tabs 110 extending axially towards the planetary gear assembly 20 and uniformly spaced around the periphery of the inner cone ring 94. The plurality of cone tabs 110 can extend through a plurality of slots 146 located on the first blocker ring 90 and through a plurality of windows 112 defined by a first member 114. The first member 114 can be a plate 114. The outer cone ring 96 can include a plurality of second cone tabs 142 for engagement with a corresponding plurality of notches 144. The plurality of notches 144 can be located on a face of the synchronizer hub 70 and operable for receiving the plurality of second cone tabs 142. When speed synchronization occurs, the shift sleeve 52 can axially slide through the external teeth 90b and into meshed engagement with plate teeth 98 located on the periphery of the first plate 114. The first plate 114 can include an inner diameter splined to the sun gear 22. The first plate 114 can include inner plate splines 158 for engagement with corresponding gear teeth disposed on the sun gear 22 such that the shift sleeve 52 can pass through the first blocker ring 90 in response to speed synchronization and axially engage the first plate 114. The shift sleeve 52 and the first plate 114 can then be rotatably coupled to the sun gear 22 for rotating the synchronizer hub 70 coupled to the first output shaft 14 at a direct drive ratio.

Figure 4B:
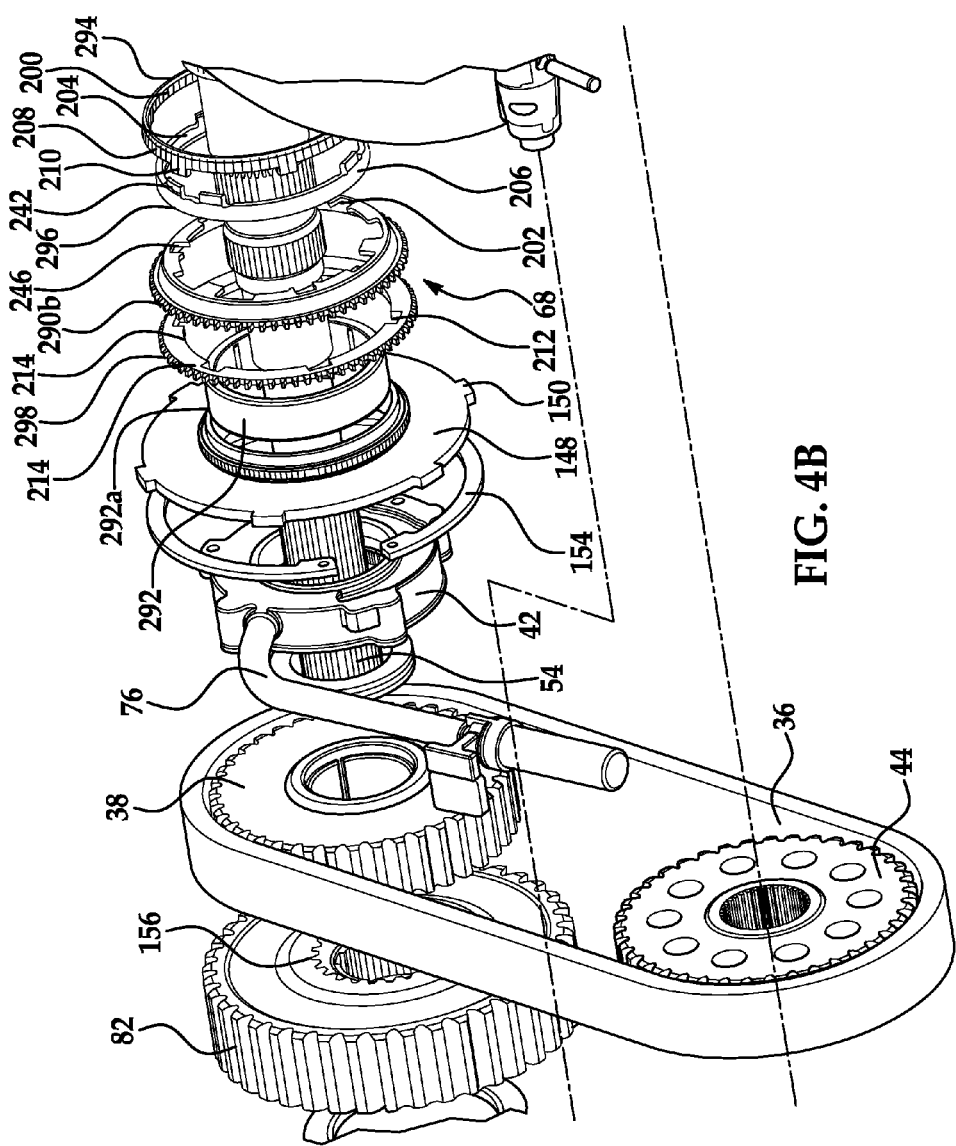
FIG. 4B is a detailed view of the synchronized range shift mechanism of FIG. 3 showing a second synchronizer assembly and a mode shift mechanism.

As best illustrated in FIG. 4B, the second synchronizer assembly 68 can include a second blocker ring 290. The second blocker ring 290 can prevent driving connection between the planetary gear carrier 26 and the first output shaft 14 until the planetary gear carrier 26 is rotated by the planetary gear assembly 20 at a common speed with the first output shaft 14 for establishing the low-range drive mode. The second blocker ring 290 can include a radial flange section 290a having external teeth 290b adapted for engagement through the inner spline surface 218 of the shift sleeve 252 in response to speed synchronization in the high-range drive mode. The second synchronizer assembly 68 can have a cone shaped body 292, an outer cone ring 296, and an inner cone ring 294. The second synchronizer assembly 68 can be of a triple cone type and can include three cone surfaces and three mating friction blocking surfaces for detecting speed synchronization. The cone 292 can have a first cone surface 292a. The inner cone ring 294 can have a second cone surface 200 on an interior surface. The second blocker ring 290 can have a third cone surface 202. The outer cone ring 296 can have a first blocking surface 204 on an interior surface engageable with the first cone surface 292a. The outer cone ring 296 can have a second blocking surface 206 on an exterior surface engageable with the second cone surface 200. The inner cone ring 294 can have a third blocking surface 208 on an exterior surface engageable with the third cone surface 202. The use of multiple cone surfaces and blocking surfaces can provide for faster speed synchronization of the rotating components. In assembly, the inner cone ring 294 can include a plurality of cone tabs 210 extending axially away from the planetary gear assembly 20 and uniformly spaced around the periphery of the inner cone ring 294. The plurality of cone tabs 210 can extend through a plurality of slots 246 located on the second blocker ring 290 and through a plurality of slots 212 defined by a second member 214. The second member can be a plate 214. The outer cone ring 296 can include a plurality of second cone tabs 242 for engagement with a corresponding plurality of second notches located on a face of the synchronizer hub 70 and operable for receiving the plurality of second cone tabs 242. The plurality of second notches can be located on an opposite face of the synchronizer hub 70 from the plurality of notches 144. When speed synchronization occurs, the shift sleeve 52 can axially slide through the external teeth 290b and into meshed engagement with plate teeth 298 located on the periphery of the second plate 214. The second plate 214 can be splined to the planetary gear carrier 26. The second plate 214 can include inner plate splines 258 located on an inner diameter of the second plate 214 for engagement with corresponding gear teeth disposed on the planetary gear carrier 26 such that the shift sleeve 52 can pass through the second blocker ring 290 in response to speed synchronization and axially engage the second plate 214. The shift sleeve 52 and the second plate 214 can then be rotatably coupled to the planetary gear carrier 26 for rotating the synchronizer hub 70 coupled to the first output shaft 14.

As illustrated in FIG. 3, the shift fork 58 can be connected to a shift actuator 74 and can rotatably engage the shift sleeve 52. The shift actuator 74 can move the shift sleeve 52 for establishing various drive modes including a two-wheel high-range drive mode, a two-wheel low-range drive mode, a neutral mode, a four-wheel high-range drive mode, and a four wheel low-range drive mode. Any suitable shift actuator is contemplated for use with the transfer case 21. By way of example and not limitation, the shift actuator 74 can include a hydraulic actuation assembly, an electric actuation assembly, or a mechanical actuation assembly. In response to the shift actuator 74, the shift fork 58 can axially slide the shift sleeve 52 for shifting between the high-range drive mode and the low-range drive mode. The shift sleeve 52 can include a plurality of prongs 134 having prong arms 136 extending radially outward from the shift sleeve 52 to support an outer ring 132 having an annular slot. The shift fork 58 can include a plurality of connectors 130 engageable within the annular slot of the outer ring 132 for interlocking axial movement of the shift fork 58 with the shift sleeve 52, while allowing rotational movement of the shift sleeve 52 relative to the shift fork 58. The shift fork 58 can slidably engage within the annular slot of the outer ring 132 to interlock the shift fork 58 with the shift sleeve 52 for axial movement allowing axial shifting movement of the synchronizer towards the planetary gear assembly 20 and in the opposite direction away from the planetary gear assembly 20. As best illustrated in FIG. 3-4A, the shift fork 58 can operably engage within the annular slot of the outer ring 132 for axially moving the shift sleeve 52 located within the housing 138. The housing 138 can be rotated relative to a stationary permanently grounded ring gear 24. The synchronizer hub 70 and first output shaft 14 can be connected to rotate in unison. The synchronizer 40 and the planetary gear assembly 20 can be received in the housing 138 and held within the housing 138 by a c-clip 154 and a housing plate 148 having plate tabs 150 for engagement with slits 152 defined by the housing 138. The plurality of prongs 134 can extend through the slits 152 in the housing 138 for supporting the outer ring 132 external to the housing, such that the housing 138, outer ring 132, prongs 134, and shift sleeve 52 can rotate in unison as a single unit while permitting axial displacement of the shift sleeve 52 by interaction of the connectors 130 of the shift fork 50 with the annular groove of the outer ring 132 such that prongs 134 axially slide within slits 152 of the housing 138 as the shift sleeve 52 is driven axially in either direction. When the shift sleeve 52 is shifted towards the planetary gear assembly 20, the inner spline surface 118 will engage with the external teeth 90b located on the first blocker ring 90. When the shift fork 58 moves into the high-range drive mode, the shift sleeve 52 can axially move to couple the first output shaft 14 with the sun gear 22 for a direct drive configuration. As in the low-range drive mode, the ring gear 24 can be grounded such that the ring gear 24 is non-rotatable with respect to the planetary gear assembly 20, avoiding an undesirable configuration where the first output shaft 14 is driven through the plurality of planetary gears 28 in the high-range drive mode. When the shift fork 58 moves into the low-range drive mode, the shift sleeve 52 can axially move to couple the first output shaft 14 with the planetary gear carrier 26 for providing a different drive ratio between the input shaft 15 and the first output shaft 14. When the vehicle is in a four-wheel drive mode and a low-range drive mode, the input shaft 15 can provide a different drive ratio to the first output shaft 14 and the second output shaft 16. As best illustrated in FIGS. 1-2, the sun gear 22 can be connected to and driven by the input shaft 15. The plurality of planetary gears 28 can be rotatable around the sun gear 22. The plurality of planetary gears 28 can be supported by the planetary gear carrier 26. The gearing ratio between the sun gear 22 and the plurality of planetary gears 28 can be a reduction ratio, rotating the first output shaft 14 at a different speed in comparison to the rotation speed of the input shaft 15. By way of example and not limitation, a reduction ratio can be provided in a range of 3:1 to 10:1, inclusive. By way of example and not limitation, the ratio can be provided to be approximately 6:1. It should be recognized by those skilled in the art, that other differential assembly designs other than the one illustrated can be employed in the transfer case 21 without departing from the spirit or scope of the present invention.

As illustrated in FIGS. 2-3 and 4B, the transfer case 21 can include a mode shift mechanism 56 located along the longitudinal axis adjacent the range shift mechanism 50 allowing a vehicle operator to selectively shift between a two-wheel drive mode and a four-wheel drive mode. The range shift mechanism 50 can be actuated independently from the mode shift mechanism 56, such that a range shift between the high-range drive mode and low-range drive mode can occur during the two-wheel drive mode and the four-wheel drive mode and a mode shift between the two-wheel drive mode and the four-wheel drive mode can occur during the high-range drive mode and the low-range drive mode. As best illustrated in FIG. 3, the second housing section 64 can receive a mode clutch 30 and the mode shift mechanism 56. The mode shift mechanism 56 can axially slideable on the first output shaft 14 and can be actuated by a clutch actuator 76 in engagement with a mode hub 42 coupled to the first output shaft 14. The clutch actuator 76 can be used with a hydraulic actuation assembly, an electromagnetic actuation assembly, or any other actuation assembly reasonably contemplated by those skilled in the art. The mode shift mechanism 56 can include the mode hub 42 and an internal mode sleeve 54. The internal mode sleeve 54 can be splined, such that the internal mode sleeve 54 is axially moveable for engagement with splines 156 defined by the clutch housing 82. A vehicle operator can selectively signal the clutch actuator 76 to change drive modes. As illustrated in FIG. 1, it is contemplated that the mode shift mechanism 56 can automatically shift the mode clutch 30 between the two-wheel drive mode and the four-wheel drive mode in response to receiving signals from a control system for detecting tractive road conditions.

The clutch actuator 76 can cause axial movement of the internal mode sleeve 54 for engagement of the mode clutch 30. The mode clutch 30 can include a clutch pack 78 received in a clutch housing 82 and having a pressure plate 80 and an arrangement of friction disks as known in the art. A power transmission member 36 can be rotatably supported on the first output shaft 14. The power transmission member 36 can have a drive gear 38 coupled to the first output shaft 14 and a chain for transmitting rotary power to a driven sprocket 44 coupled to the second output shaft 16. When in the two-wheel drive mode, the drive gear 38 and mode hub 42 can uniformly rotate with the first output shaft 14 in the high-range drive mode or low-range drive mode. When shifting from the two-wheel drive mode into a four-wheel drive mode, the internal mode sleeve 54 can shift along the longitudinal axis for engaging the mode clutch 30 through the mode hub 42, the drive gear 38, and the splines 156 in the clutch housing 82. When the mode clutch 30 is engaged, the clutch pack 78 can be shifted axially to a position where the clutch housing 82 transfers rotary power through the drive gear 38 to the power transmission member 36 and through the power transmission member 36 to the driven sprocket 44 connected to the second output shaft 16. The first output shaft 14 and the second output shaft 16 can be driven in uniform rotation with the mode clutch 30 engaged. When shifting from the four-wheel drive mode to the two-wheel drive mode, the internal mode sleeve 54 can shift out of engagement with the mode clutch 30, disengaging the transfer of rotary power to the power transmission member 36 and the second output shaft 16.

Referring now to FIGS. 5-13B, the vehicle can include an electro-mechanical transfer case 310 having a synchronized range shift mechanism that can be operated through a reversible electric motor 344 controlled in accordance with a control program stored in memory within an engine control unit (ECU) 321 in response to signals received from one or more vehicle sensors 323 and/or a mode select mechanism 325. The transfer case 310 can be equipped with a synchronizer 340, a range shift mechanism 360, 460, a mode shift mechanism 380, 480, and an actuating gear 348, 448 for actuating the range shifting function of the range shift mechanism 360, 460 and actuating the mode shifting function of the mode shift mechanism 380, 480. The mode shift mechanism 380, 480 can include a clutch actuator 388, 488 movable between a contracted position and an expanded position for engaging the mode clutch 30 when in the expanded position. The ECU 321 can control actuation of the reversible electric motor 344 for driving the actuating gear 348, 448. As best illustrated in FIGS. 5-8, the control system can include the at least one sensing element 323 for detecting the position of the actuating gear 348, 448. The engine control unit 321 can operate in an automatic mode automatically controlling the reversible electric motor 344, or can allow the driver to select one of the available drive modes and ranges in a manual mode of operation through the mode selection mechanism 325. In either case, the control system 321 can provide for control signals being sent to the transfer case 310 to cause the transfer case 310 to actuate the range shift mechanism 360, 460 and/or the mode shift mechanism 380, 480 in response to the at least one sensing element 323 and/or a detected position of the actuating gear 348, 448.

Figure 5:
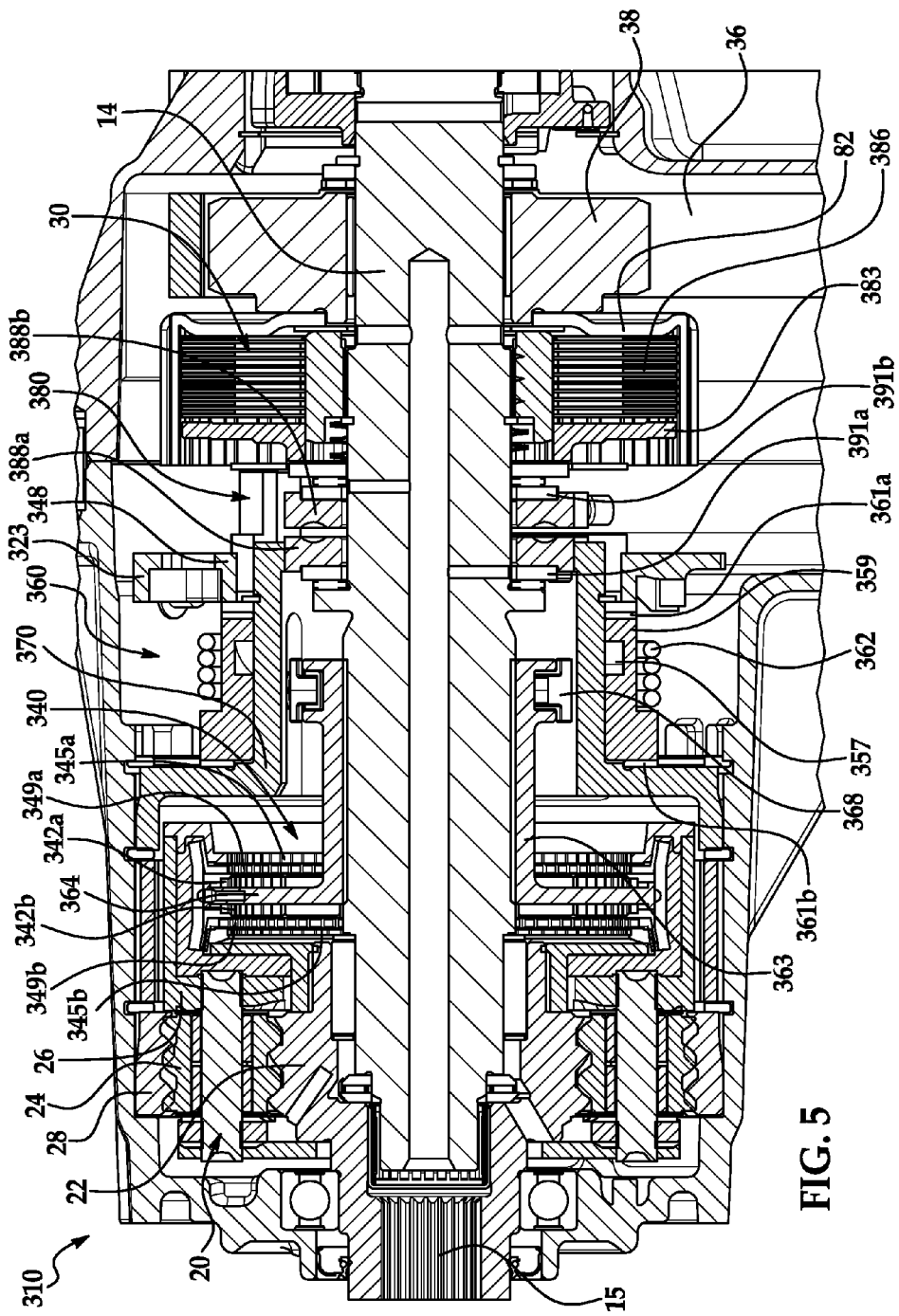
FIG. 5 is a sectional view of an electro-mechanical transfer case including the synchronized range shift mechanism and a modular actuating device having an actuating gear interposed between the range shift mechanism and the mode shift mechanism, an expandable clutch actuator, and a barrel cam connected for rotation in response to rotation of the actuating gear.
Figure 8:
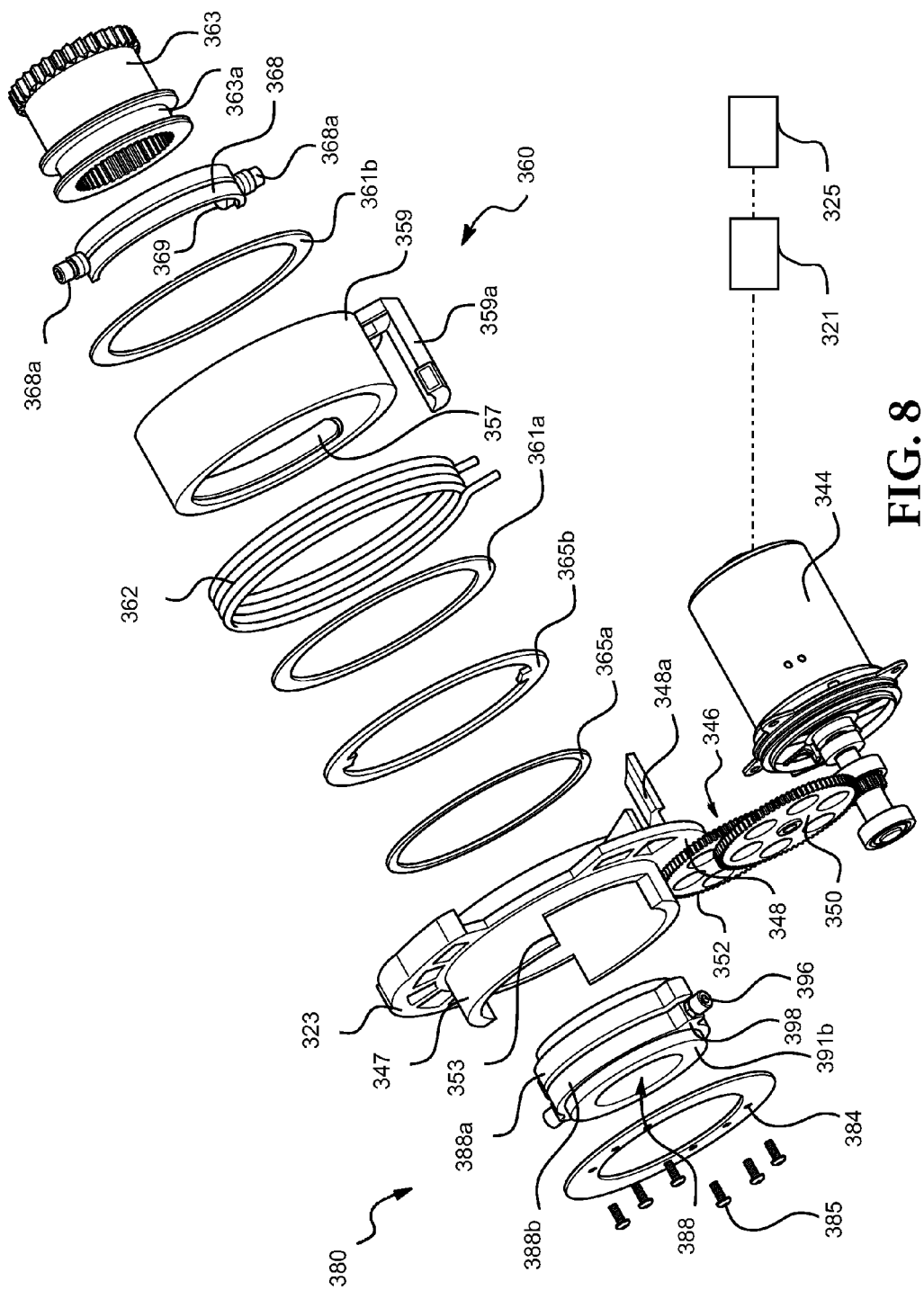
FIG. 8 is an exploded view of the range shift mechanism having a torsion wrap spring engageable between the barrel cam and the actuating gear for biasing the barrel cam to follow reversible rotational movement of the actuating gear.
Figure 11:
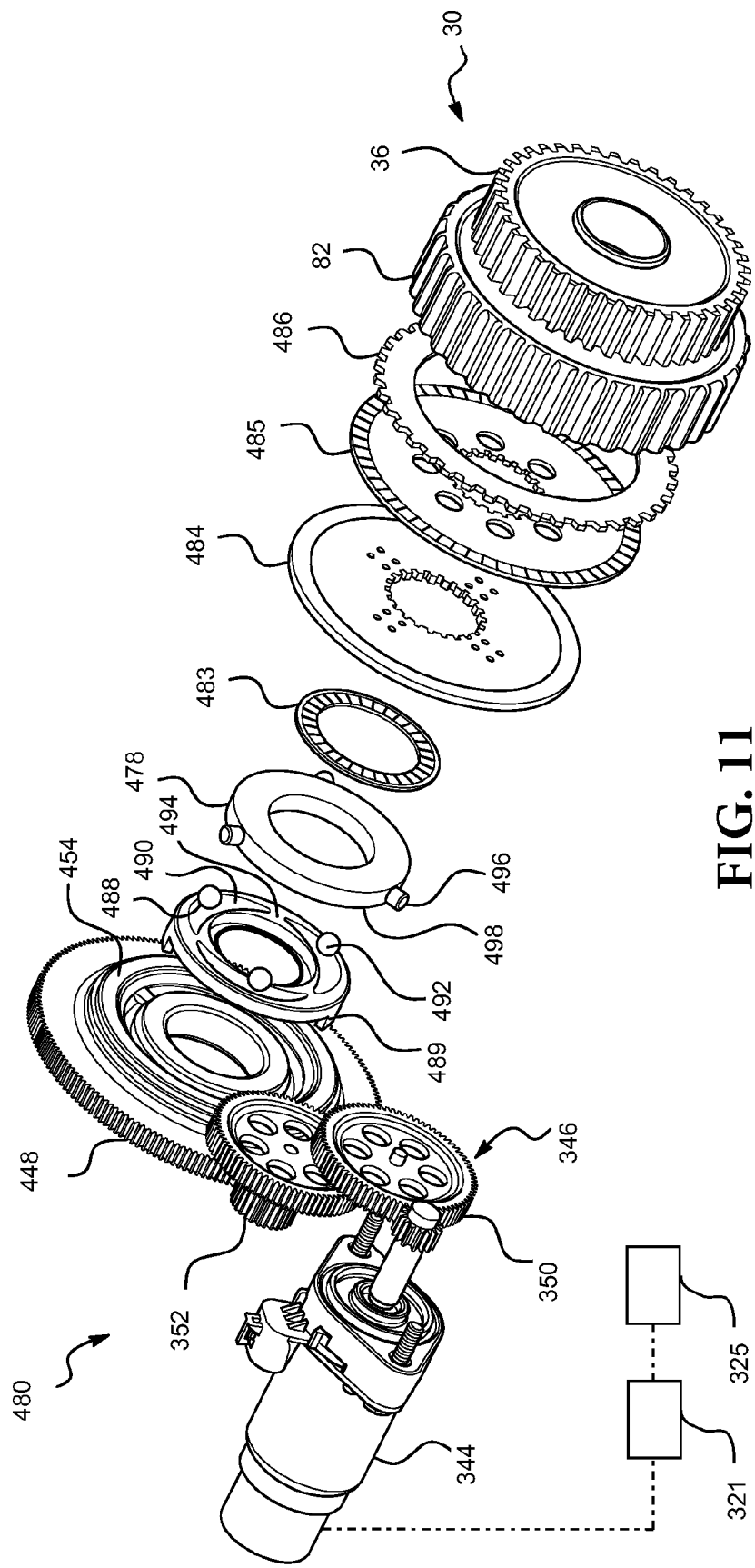
FIG. 11 is an exploded view of the mode shift mechanism showing a clutch actuator having a plurality of clutch actuating tabs engageable with a corresponding plurality of elongated arcuate pocket slots defined by the actuating gear.
Figure 12:
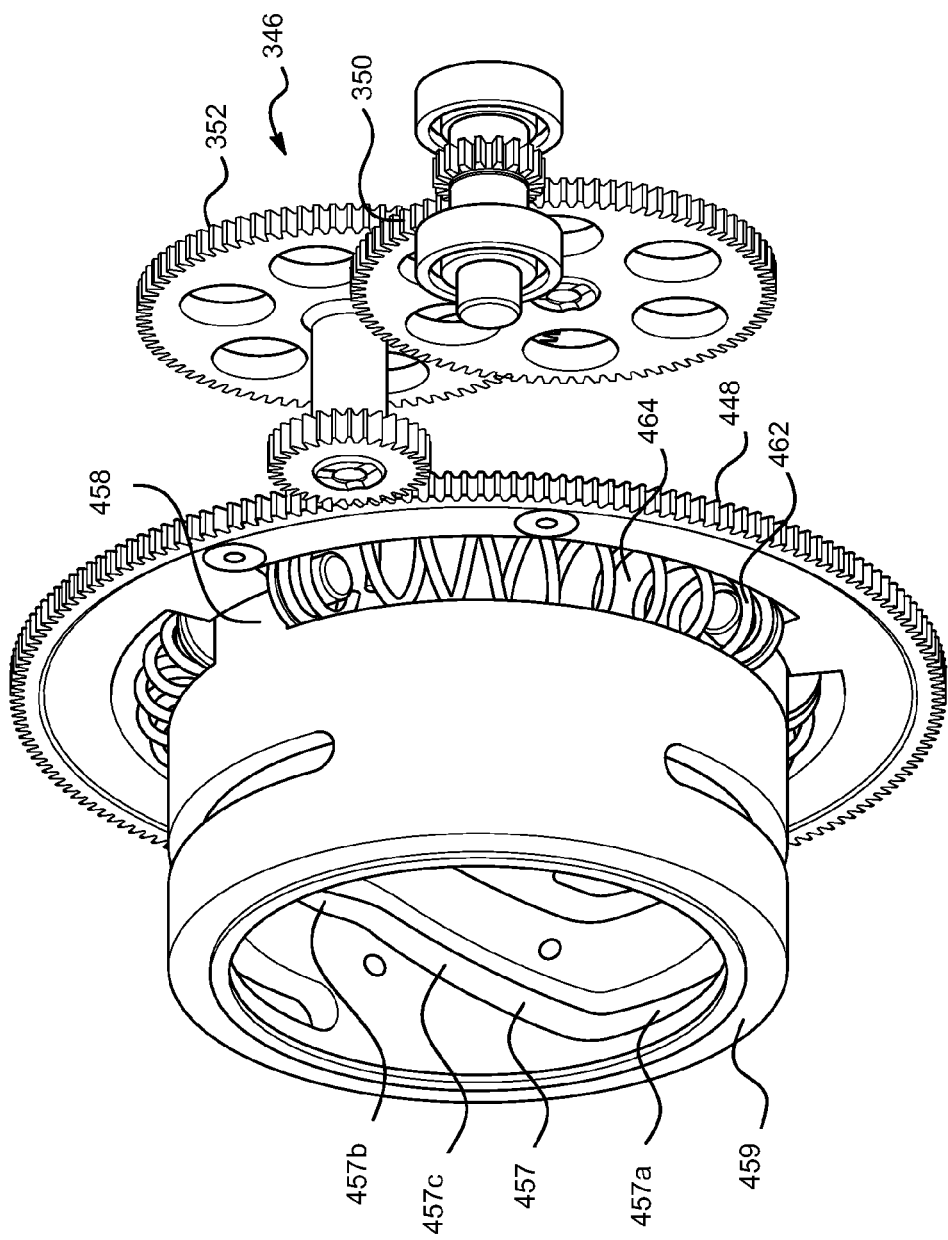
FIG. 12 is an enlarged view of the modular actuating device showing the barrel cam having a cam surface groove for travel of a shift fork for shifting between a low-range drive mode and a high-range drive mode.

As illustrated in FIG. 5, the input shaft 15 can be rotatable with respect to the longitudinal axis. The range shift mechanism 360, 460 and the mode shift mechanism 380, 480 can be located along the longitudinal axis and positioned longitudinally adjacent to one another. This configuration provides for the use of fewer off-axis components in performing the shifting functions of the range shift mechanism 360, 460 and the mode shift mechanism 380, 480. The actuating gear 348, 448 can be located coaxial with the longitudinal axis and interposed between the range shift mechanism 360, 460 and mode shift mechanism 380, 480, such that the actuating gear 348, 448 operatively engages and operates the range shift mechanism 360, 460 during a portion of angular rotation about the common primary axis, while the actuating gear 348, 448 operatively actuates the mode shift mechanism 380, 480 during another portion of angular rotation about the common primary axis. A reversible electric motor 344 can be located off-axis with respect to the common primary axis for driving the actuating gear 348, 448 in rotation about the common primary axis. The actuating gear 348, 448 can be configured for reversible rotation about the common primary axis through an angular arc of less than 360 degrees. As best illustrated in FIGS. 8 and 11-12, a gear train 346 can transfer the drive torque from the electric motor 344 to the range shift mechanism 360, 460 and the mode shift mechanism 380, 480. The gear train 346 can include a plurality of gears and can be reversibly driven by the electric motor 344. One of the plurality of gears can be the actuating gear 348, 448 reversibly rotatable about the common primary axis and located between the range shift mechanism 360, 460 and the mode shift mechanism 380, 480.

Figure 6:
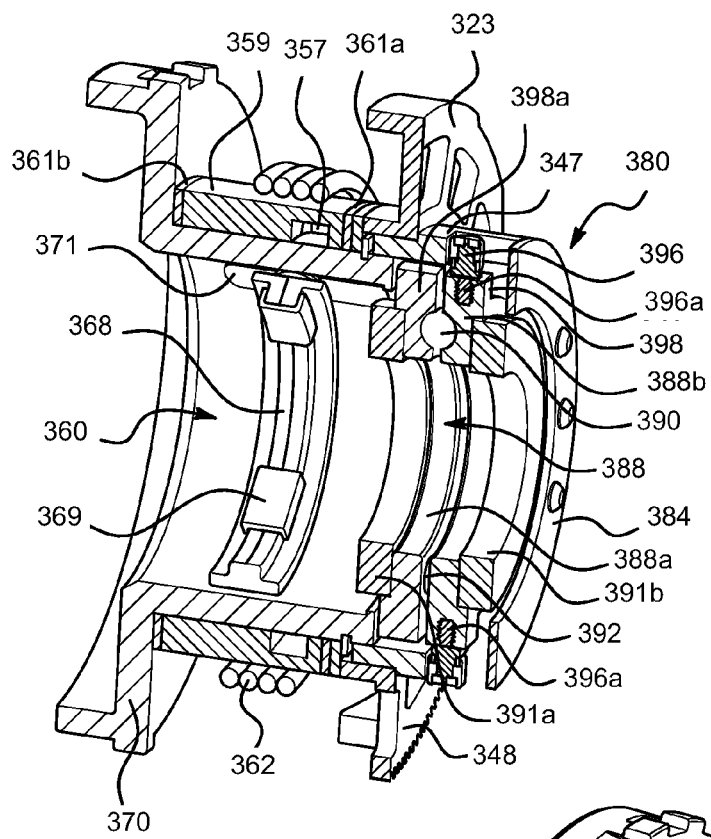
FIG. 6 is a cross-sectional view of the modular actuating device of FIG. 5.
Figure 7:
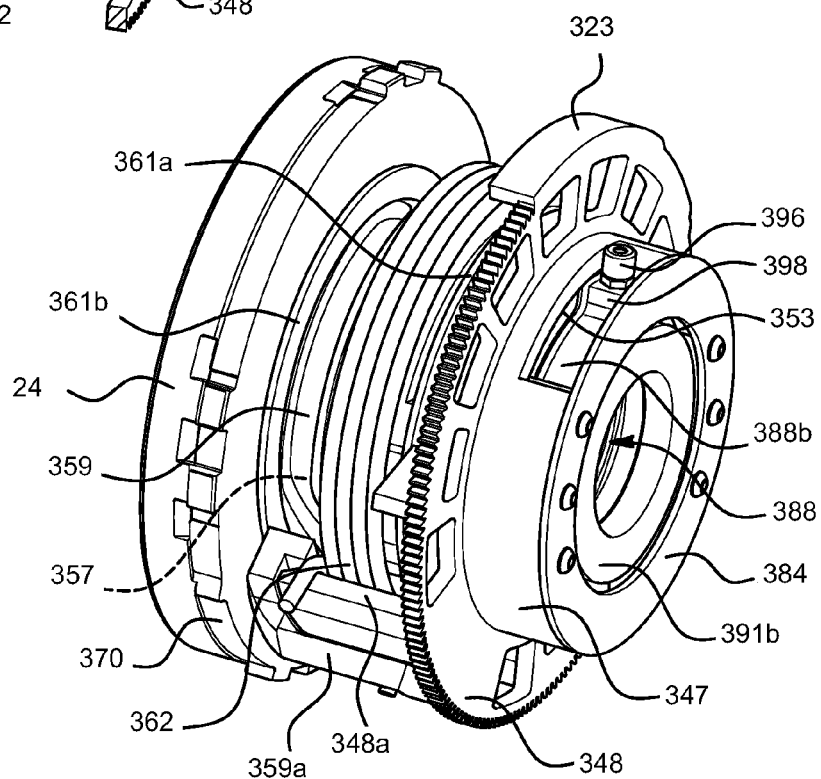
FIG. 7 is a perspective view of the modular actuating device of FIG. 5.

Referring now to FIGS. 6-8, the actuating gear 348 can operably engage a barrel cam 359 of the range shift mechanism 360 for actuating the range shift mechanism 360 during a portion of angular rotation about the primary axis. The actuating gear 348 can include an axially extending collar 347 with removed notches located opposite the range shift mechanism 360 for supporting a clutch actuation mechanism. The clutch actuator 388 can include a retainer 388a and a clutch actuating cam 388b rotatable in response to rotation of the actuating gear 348. The clutch actuating cam 388b can axially move towards the mode clutch 30 for disengaging the mode clutch 30 during rotation of the actuating gear 348 prior to shifting the range shift mechanism 360 between the high-range drive mode and low-range drive mode. In other words, the clutch actuating cam 388b can move to disengage the mode clutch 30 while maintaining the range shift mechanism 360 in either the high-range drive mode or the low-range drive mode. The actuating gear 348 can be axially located adjacent to a barrel cam 359 with a thrust bushing 361a and ring members 365a, 365b interposed between the barrel cam 359 and actuating gear 348. A thrust bushing 361b can be interposed between the barrel cam 359 and the shift collar 370. The barrel cam 359 can be indirectly connected for rotation in response to rotation of the actuating gear 348 through torsional wrap spring 362. As best illustrated in FIGS. 5-7, the barrel cam 359 can be interposed between thrust bushings 361a, 361b and can include a barrel tab 359a extending axially toward the actuating gear 348. The actuating gear 348 can include an actuating gear tab 348a extending axially toward the range shift mechanism 360 and radially spaced from the barrel cam 359. The actuating gear tab 348a can move angularly in either rotational direction with respect to the barrel tab 359a. The barrel tab 359a and actuating gear tab 348a can move in rotation independently with respect to one another, such that driving force is loaded into a torsional wrap spring 362 by rotational movement of the actuating gear tab 348a in either rotational direction and the rotational driving force is transferred through the torsional wrap spring 362 to the barrel tab 359a to urge rotation of the barrel cam 359 to follow the rotational direction of movement of the actuating gear 348.

As best illustrated in FIGS. 6-8, the barrel cam 359 can include a cam surface groove 357 extending circumferentially and axially along an interior surface of the barrel cam 359. An axially extending portion of the cam surface groove 357 can define an axial range shift movement in response to rotation of the barrel cam 359. Circumferentially extending portions at either end of the axially extending portion of the cam surface groove 357 can define a clutch actuation movement in response to rotation of the barrel cam 359. The range shift mechanism 360 can include the torsional wrap spring 362 extending around the outer circumference of the barrel cam 359 for biasing the barrel cam 359 to follow rotational movement of the actuating gear 348, allowing completion of range shift movement if temporarily blocked due to unmeshed gear teeth engagement during axial movement.

The wrap spring 362 can hold the barrel tab 359a and the actuating gear tab 348a in radial alignment with one another after completion of rotational driving movement. The wrap spring 362 is constrained to follow movement of the actuating gear 348 and can be loaded with force in either rotational direction of the actuating gear 348. The loaded force of the torsional wrap spring 362 urges rotational movement of the barrel cam 359 to follow rotational movement of the actuating gear 348. When loaded with force, the wrap spring 362 continually biases the barrel cam 359 in the desired direction of movement until the range shift movement or clutch actuation movement is completed. A shift fork 368 can be driven to move in guided travel along the cam surface groove 357 in an axial direction in response to rotation of the barrel cam 359 by the actuating gear 348 to actuate the range shift function between a low-range drive mode and a high-range drive mode of operation. The shift fork 368 can be operably engageable with the barrel cam 359 through a shift collar 370. The barrel cam 359 can be rotatably biased toward the desired rotational movement by the wrap spring 362, even if axial movement of the shift fork is temporarily blocked, while the actuating gear 348 continues to rotate. When axial movement of the shift collar 370 is blocked during rotation of the barrel cam 359, the wrap spring 362 can be loaded with rotational energy to bias the barrel cam 359 to move rotationally in a desired direction when the blocked condition ceases. The wrap spring 362 can store energy between the electric motor 344 and the shift fork 368 until the desired range mode shift is completed.

The actuating gear 348 can actuate the range shift mechanism 360 through rotational movement of the actuating gear tab 348a located on a side facing the range shift mechanism 360. As best illustrated in FIG. 8, the gear train 346 can include an input gear 350 driven by the electric motor 344. The gear train 346 can further include an intermediate output gear 352. The gear train 346 can be reversibly driven by the reversible electric motor 344. The input gear 350 can rotate the intermediate output gear 352. The intermediate output gear 352 can rotate the actuating gear 348. The range shift mechanism 360 can include a barrel cam 359 having a cam surface groove 357 extending circumferentially and axially along an interior surface of the barrel cam 359 to define an axial range shift movement in response to rotation of the barrel cam 359. A shift fork 368 can travel along the cam surface groove 357 to shift the range shift mechanism 360 between a low-range drive mode position and a high-range drive mode position. The barrel cam 359 can be rotatable about the common primary axis through an arc of less than 360 degrees in response to rotation of the actuating gear 348 in either rotational direction. As best shown in FIGS. 6 and 8, the range shift mechanism 360 can further include a shift collar 370 with an axial groove 371 allowing passage of a cam follower portion 368a of the shift fork 368 radially into engagement within the cam surface groove 357 of the barrel cam 359 for driving axial travel of the shift fork 368 in response to rotation of the barrel cam 359. The shift fork 368 can act as a cam follower traveling within the cam surface groove 357 of the barrel cam 359 as the barrel cam 359 is rotated in either rotational direction. The shift fork 368, barrel cam 359, and shift collar 370 can surround an axially moveable and rotatable range sleeve 363. The range sleeve 363 can include a groove 363a engageable with an internal surface 369 of the shift fork 368 allowing rotation of the range sleeve 363 relative to the shift fork 368. As best illustrated in FIG. 6, the shift collar 370 is a cylindrical element connected to the shift fork 368 through an axial groove 371 allowing guided axial movement of the shift fork 368, while preventing rotational movement of the shift fork 368. The shift collar 370 allows the shift fork 368 to slide in an axial direction to drive the range sleeve 363 in response to shifting rotational movement of the barrel cam 359 between a low-range angular position and a high-range angular position. The shift fork 368 supports the range sleeve 363 for rotation and axial movement through engagement of internal ridge surface 369 of the shift fork 368 within groove 363a of the range sleeve 363. The range sleeve 363 can be engageable between the range shift mechanism 360 and a planetary gear assembly 20. After synchronization by a synchronizer 340, the range sleeve 363 transfers rotation from the planetary gear assembly 20 to the first output shaft 14 through a splined connection allowing axial movement of the range sleeve 363 with respect to the output shaft 14. As previously described, the planetary gear assembly 20 can vary the drive power between the input shaft 15 and the output shafts 14, 16.

When the control system 321 shifts the vehicle into a high-range drive mode, the control system 321 can send a control signal to the electro-mechanical transfer case 310. The actuating gear 348 can be rotated by the electric motor 344 within the transfer case 310 to drive actuating gear tab 348a to load biasing force into torsional wrap spring 362. The barrel cam 359 can be rotated in response to biasing force applied by torsional wrap spring 362 to barrel tab 359a. In response to rotation of the barrel cam 359, the shift fork 368 is driven to travel in an axial direction following the cam surface groove 357 of the barrel cam 359. The cam surface groove 357 includes a first end portion, a second end portion, and an intermediate portion extending between the first end portion and the second end portion. The first end portion can have a predetermined circumferential arcuate length and can lie in a first plane perpendicular to the primary rotational axis. The second end portion can have a predetermined circumferential arcuate length and can lie in a second plane perpendicular to the primary rotational axis axially spaced from the first plane. The intermediate portion of the cam surface groove 357 can extend arcuately and axially between the first end portion and the second end portion to define axial shifting movement of the shift fork 368 between the low-range mode and high-range mode of operation. The first and second end portions define a period of dwell at the first end portion and the second end portion of the cam surface groove 357 of the barrel cam 359. Each end portion of the cam surface groove 357 can allow actuation of the clutch actuator 388 prior to beginning axial shifting movement of the shift fork 368, such that the shift fork 368 can remain axially stationary at each end portion of the cam surface groove 357 while the clutch actuator 388 is operated between the contracted position and the expanded position. The shift fork 368 axially slides the range sleeve 363 of the range shift mechanism 360 between the high-range drive mode position, a neutral position, and a low-range drive mode position. When the shift fork 368 moves into the period of dwell at the first end of the barrel cam 359, the shift fork 368 remains axially stationary within the axial groove 371 formed in the shift collar 370 while sliding peripherally within the barrel cam groove 357 to actuate the clutch actuator 388. When the shift fork 368 leaves a period of dwell at the first end of the barrel cam 359, the shift fork 368 moves axially from a first position toward a second position located axially away from the actuating gear 348 in a direction toward the input shaft 15. The period of dwell at the first end of the barrel cam 359 can define the high-range drive mode and first actuation region of the clutch actuator 388. When the control system 321 shifts the vehicle into the low-range drive mode, the barrel cam 359 can be rotated by the actuating gear 348, such that the shift fork 368 moves toward and enters within the period of dwell located at the second end of the barrel cam 359 defining the low-range mode of operation and a second actuation region of the clutch actuator 388. When the shift fork 368 moves toward the low-range mode of operation portion of the cam surface groove 357, the shift fork 368 slides along the axial groove 371 formed in the shift collar 370 driving the range sleeve 363 through the synchronizer 340. It should be recognized by those skilled in the art that any suitable synchronizer could be used for synchronizing the range shift mechanism 360, 460 and the planetary gear assembly 20. By way of example and not limitation, it is contemplated that a synchronizer as disclosed in U.S. Pat. No. 8,863,928, assigned to Hoerbiger Antriebstechnik Holding GmbH, would be suitable for use in the present invention. A complete description of the structure, function and operation of a synchronizer can be found in U.S. Pat. No. 8,863,928 which is incorporated by reference herein in its entirety.

As best illustrated in FIG. 5, the range sleeve 363 can include a flange 364 extending radially outwardly with respect to the longitudinal axis. The flange 364 can define an axially moveable transmitter. The synchronizer 340 can include the transmitter having an external splined surface 342a, 342b axially moveable for transferring torque from the input shaft 15 to the first output shaft 14 through the planetary gear carrier 26 in the low-range drive mode and through the sun gear 22 in the high-range drive mode. The synchronizer 340 can include a first gear 345a mounted along the longitudinal axis and adjacent the transmitter. The first gear 345a can be connected to the planetary gear carrier 26 and can have an internal splined surface engageable with the external spline surface 342a of the transmitter for establishing the low-range drive mode to provide a drive ratio of less than one to one. The synchronizer 340 can include a second gear 345b mounted to the longitudinal axis and adjacent the external splined surface 342b of the transmitter. The second gear 345b can be located opposite the first gear 345a such that the transmitter is interposed between the first gear 345a and the second gear 345b. If the gear ratio is to be changed, the transmitter can be axially shifted by the range sleeve 363 until the external splined surface 342a, 342b engages with the internal spline of the first gear 345a or the second gear 345b. The synchronizer 340 can include a first synchronizer ring 349a interposed between the transmitter and the first gear 345a. The first synchronizer ring 349a can include an internal splined surface engageable with the external splined surface 342a of the transmitter for preventing driving connection between the transmitter and the first gear 345a until the transmitter and the first gear 345a are rotating at an approximately common speed in the low-range drive mode. The synchronizer 340 can include a second synchronizer ring 349b interposed between the transmitter and the second gear 345b. The second synchronizer ring 349b can include an internal splined surface engageable with the external splined surface 342b of the transmitter for preventing driving connection between the transmitter and the second gear 345b until the transmitter and the second gear 345b are rotating at an approximately common speed in the high-range drive mode. The synchronizer rings 349a, 349b can include annular frictional bodies. Each frictional body can include a slight outward conical taper with respect to the transmitter. The synchronizer rings 349a, 349b can be connected to each other by a positive-locking connection, as described in U.S. Pat. No. 8,863,928.

When the range shift mechanism 360 is in the low-range drive mode, the input shaft 15 can provide a lower drive ratio to the first output shaft 14 and the second output shaft 16 compared to the high-range drive mode. When in the high-range mode of operation, the barrel cam 359 slides the shift fork 368 along the axial groove 371 formed in the shift collar 370 to drive the range sleeve 363 for engagement with the sun gear 22 of the planetary gear assembly 20 for a direct drive configuration. When the shift fork 368 is driven into a low-range drive mode portion of the cam surface groove 357, the range sleeve 363 can axially move to couple the output shaft 14 with the planetary gear carrier 26. When the shift fork 368 is driven into the high-range drive mode portion of the cam surface groove 357, the range sleeve 363 can axially move to couple the output shaft 14 with the sun gear 22. The gear teeth of the range sleeve 363 can engage with the internal teeth associated with the sun gear 22. The sun gear 22 can be driven by the input shaft 15. The plurality of planetary gears 28 can be rotatable around the sun gear 22. The planetary gear assembly 20 can include a planetary gear carrier 26. Drive torque can be transferred to the output shaft 14 directly from the sun gear 22 or indirectly through the planetary gear carrier 26 depending on the drive ratio desired. The gearing ratio between the sun gear 22 and the plurality of planetary gears 28 can be a reduction ratio, rotating the first output shaft 14 at a different lower speed in comparison to the rotation speed of the input shaft 15. Any range shift mechanism 360 having an axially movable member driven by a concentric gear coaxially interposed between the range shift mechanism 360 and mode clutch 30 through a barrel cam to establish first and second drive ratio connections and including a clutch actuator 388 to actuate the mode clutch 30 is considered to be within the scope of the present invention. It should also be recognized by those skilled in the art, that other differential assembly designs other than the one illustrated can be employed in the transfer case 310 without departing from the spirit or scope of the present invention.

Figure 9:
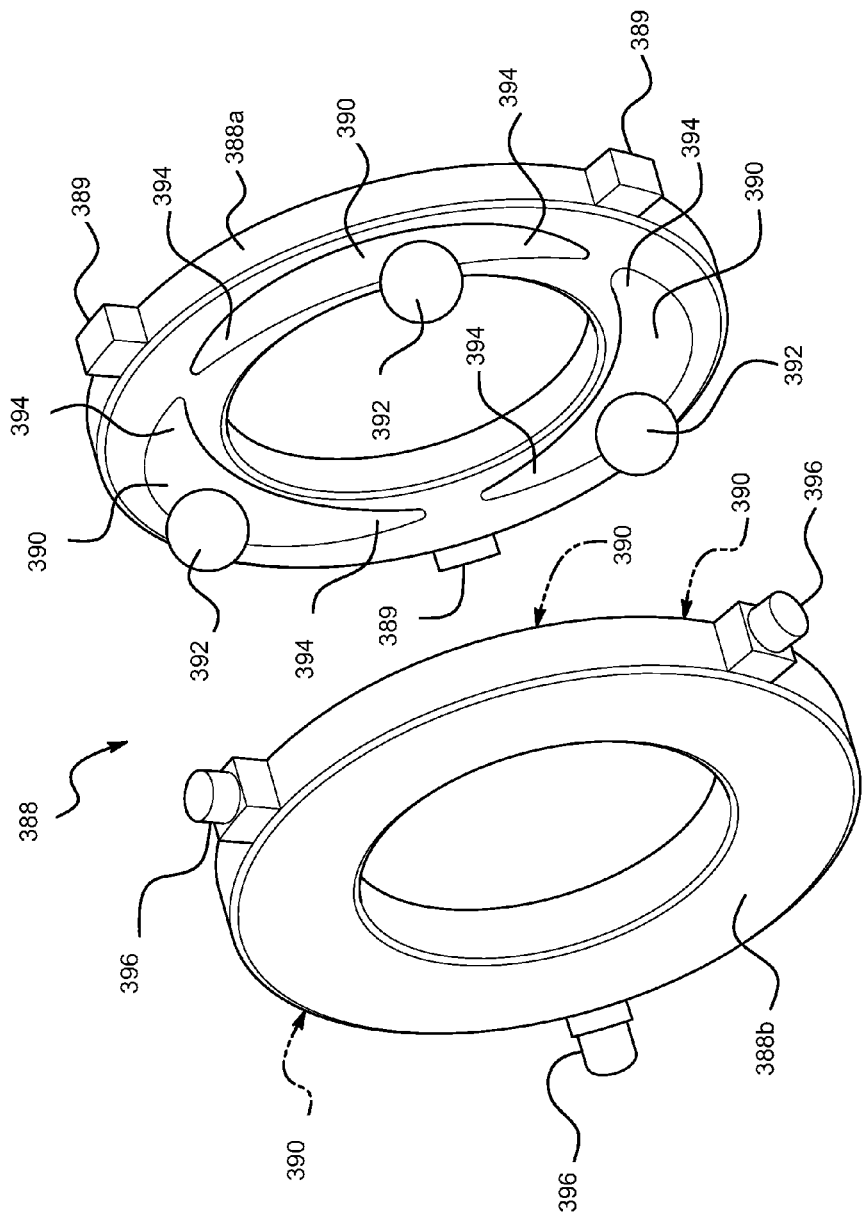
FIG. 9 is an exploded detail view of the clutch actuator having a stationary retainer portion and a rotatable clutch actuating cam portion.

Referring now to FIGS. 8-9, the actuating gear 348 can also engage the mode clutch 30 through a face opposite from the range shift mechanism 360. The gear train 346 can include an input gear 350 driven by the reversible electric motor 344 within the transfer case 310. The gear train 346 can further include an intermediate output gear 352. The input gear 350 can rotate the intermediate output gear 352 which can engage the input gear 350 and the actuating gear 348. The intermediate output gear 352 can reversible rotate the actuating gear 348 through an angular arc. By way of example and not limitation, the angular arc of actuating gear 348 rotation can be of less than 360 degrees. A clutch actuator 388 can be moved between an axially expanded position and an axially contracted position in response to rotation of the actuating gear 348. As best seen in FIGS. 8-9, the clutch actuator 388 can include a retainer 388a and a clutch actuating cam 388b that can be rotatable in response to rotation of the actuating gear 348. The retainer 388a can include tabs 389 to be coupled to the shift collar 370 within complementary recesses for preventing rotation with respect to the actuating gear 348. The clutch actuating cam 388b can be driven in rotation by the actuating gear 348 in response to interaction between the pins 396 with the notched portions 353 of the collar 347 for driving the clutch actuating cam 388b axially towards the mode clutch 30 for engaging the mode clutch 30. The clutch actuating cam 388b can be driven axially in response to the rolling members 392 movement relative to inclined ramp portions adjacent outer ends 394 of each elongated arcuate recesses 390 formed in the surfaces facing one another between the clutch actuating cam 388b and retainer 388a.

The cam surface groove 357 of the barrel cam 359 can include a period of dwell on either end of the axial travel of the shift fork 368 within the cam surface groove 357. When the shift fork 368 is in the period of dwell during one of the high-range drive mode and the low-range drive mode, the shift fork 368, acting as a cam follower, is axially stationary while the actuating gear 348 can be rotated. The clutch actuating cam 388b can be rotated with respect to the retainer 388a in response to rotation of the actuating gear 348 toward the axially expanded position allowing engagement of the mode clutch 30. When the shift fork 368 is in the range shift portion of the cam surface groove 357, the mode clutch 30 can be disengaged. The actuating gear 348 can be reversibly rotated and a clutch return spring can be provided to urge the clutch actuating cam 388b toward the axially contracted position in response to reverse rotation of the actuating gear 348 from the clutch engaged position.

When the shift fork 368 is in the range shift portion of the cam surface groove 357 and rotation of the barrel cam 359 is blocked due to axial movement of the range sleeve 363 being blocked until proper intermeshing teeth alignment is achieved to complete the requested range mode shift, the wrap spring 362 can act to receive the load allowing the actuating gear 348 to continue to rotate. When the actuating gear 348 is rotated by the reversible electric motor 344, the clutch actuating cam 388b can be rotated by the actuating gear 348 relative to the stationary retainer 388a. The retainer 388a can be located coaxial with respect to the clutch actuating cam 388b and axially adjacent to the clutch actuating cam 388b. The retainer 388a can be supported by tabs 389 engaged within complementary recesses formed in the shift collar 370 for preventing rotation with respect to the actuating gear 348. The retainer 388a and clutch actuating cam 388b can define a plurality of elongate arcuate recesses 390, where each recess has a deep central portion tapering to a shallow depth at outer ends 394. The plurality of elongate arcuate recesses 390 can receive a corresponding plurality of rolling members 392 with one rolling member 392 per recess 390. The clutch actuating cam 388b can be positioned to trap the plurality of rolling members 392 interposed between the retainer 388a and the clutch actuating cam 388b. The plurality of rolling members 392 can be located within corresponding elongated arcuate recesses for operable engagement with the clutch actuating cam 388b. The clutch actuating cam 388b can be angularly rotatable with respect to the retainer 388a in response to rotation of the actuating gear 348. As best illustrated in FIGS. 6-7 and 9, the clutch actuating cam 388b can include a plurality of pins 396 supported on a surface 398 of the clutch actuating cam 388b for imparting angular rotation to the clutch actuating cam 388b with respect to the retainer 388a through the actuating gear 348 by interaction with the cutout notches 353 formed in the collar 347. The plurality of pins 396 can allow axial movement of the clutch actuating cam 388b with respect to the retainer 388a while providing a free floating movement between the clutch actuating cam 388b and the actuating gear 348. The plurality of pins 396 can be screwed to the surface 398 via screws 396a. The retainer 388a can also include a surface 398a adjacent the surface 398 of the clutch actuating cam 388b. The surface 398a of the retainer 388a can be supported by the shift collar 370 through tabs 389 engaged within corresponding recesses formed in the shift collar 370. The axially extending collar 347 of the actuating gear 348 can define at least one arcuate notch 353. The at least one arcuate notch 353 can correspond in number to the plurality of pins 396 with one arcuate notch 353 receiving one corresponding pin 396 for allowing angular driven rotation and corresponding axial movement of the clutch actuating cam 388b in response to angular rotation of the actuating gear 348. The pin 396 can be engageable within the arcuate notch 353 to provide a free floating movement between the clutch actuating cam 388b and the actuating gear 348. In other words, the combination of pin 396 and notch 353 creates a lost motion mechanism operable in an angular region of movement during reversal of a direction of rotation of the actuating gear 348 providing for a predetermined degree of angular movement at each end limit of travel prior to angular driving force being transferred to the pin 396 by an end wall of notch 353. A retaining plate 384 can engage with the axially extending collar 347 of the actuating gear 348 for enclosing the retainer 388a and the clutch actuating cam 388b and limiting axial travel of the clutch actuating cam 388b. The retaining plate 384 can be connected to the axially extending collar 347 of the actuating gear 348 with a plurality of bolts 385.

The clutch actuating cam 388b can be axially moveable along the common primary axis towards the mode clutch 30 in response to movement of the rolling member 392 along the corresponding elongated arcuate recess toward one of the tapered outer ends causing a distance between the retainer 388a and the clutch actuating cam 388b to increase. In response to rotational movement of the actuating gear 348, each of the plurality of rolling members 392 slide or roll to an outer shallower end portion of the corresponding elongated arcuate recess 390 causing axial movement of the clutch actuating cam 388b away from the retainer 388a and toward the mode clutch 30. Depending on the mode clutch design, the clutch actuating cam 388b can operate to drive an apply plate 383 between first and second axial positions to apply and engage the clutch as the rolling members 392 move between the deeper central portion of the recesses 390 and the outer tapering shallower end portions of the recesses 390. When the range shift mechanism 360 is in either the low-range drive mode or a high-range drive mode and it is desired that the mode clutch 30 is engaged, the reversible electric motor 344 can drive the actuating gear 348 to rotate the retainer 388a in the either direction allowing the plurality of rolling members 392 to move from the deeper central portion of the retainer 388a toward one of the shallower end portions 394 of the recess 390. A biasing member located in the mode clutch 30, such as a spring or hydraulic force, can bias the mode clutch 30 against the apply plate 83 to force the actuating cam 388b back towards the retainer 388a allowing disengagement of the mode clutch 30 during range shifting.

The mode clutch 30 can be disengaged prior to shifting of the range shift mechanism 360 between the high-range drive mode and the low-range drive mode to prevent transfer of rotational torque through the mode clutch 30 to the second output shaft 16, essentially providing capability for two-wheel drive mode and four wheel drive mode in either the high-range drive mode or the low-range drive mode if desired. In other words, the mode clutch 30 can be disengaged when the range shift mechanism 360 is in the high-range drive mode or the low-range mode to establish a two-wheel drive mode. When the range shift mechanism 360 is in one of the high-range drive mode and the low-range drive mode, the actuating gear 348 can be rotated to actuate the clutch actuating cam 388b and engage the mode clutch 30, establishing a two-wheel drive mode during either the high-range drive mode or the low-range drive mode, if further rotation of the actuating gear 348 is stopped with the shift fork 368 still positioned within one of the dwell regions of the cam surface groove 357 of the barrel cam 359. During the high-range drive mode or the low-range drive mode and after actuation of the mode clutch 30, the barrel cam 359 can be further rotated, in response to further rotation of the actuating gear 348, causing the shift fork 368 to travel beyond the corresponding one of the dwell regions of the cam surface groove 357 of the barrel cam to begin actuation of the range shift mechanism 360. In other words, the shift fork 368 can be maintained axially stationary during actuation of the mode shift mechanism 380, 480 while the cam follower portion of the shift fork 368 is engaged with one of the dwell regions of the cam surface groove 357 of the barrel cam 359.

As best illustrated in FIG. 5-7, the mode clutch 30 can further include the apply plate 383, a plurality of clutch discs 386, a clutch housing 82, a drive gear 38, and wear pads 391a, 391b. When the mode clutch 30 is engaged to establish an all-wheel drive mode, the drive gear 38 can be rotatable with respect to the primary axis and can drive the second output shaft 16 through the power transmission member 36. The apply plate 383 can be axially driven by the clutch actuating cam 388b to engage the plurality of clutch discs 386 located along the common primary axis. The apply plate 383 can be axially moveable between a first clutch position and a second clutch position. When the actuating gear 348 is stationary and the plurality of rolling members 392 are located within the deeper central portion of the recesses 390 of the retainer 388a and clutch actuating cam 388b, the apply plate 383 can be located in a first position axially away from the plurality of clutch discs 386 wherein the mode clutch 30 is disengaged preventing drive torque from being transferred through the mode clutch 30 to the second output shaft 16. When the actuating gear 348 is rotated and the plurality of rolling members 392 are rotated to one of the elevated shallower outer end portion of the tapering recesses 390 to axially move the clutch actuating cam 388b towards the mode clutch 30, the clutch actuating cam 388b axially exerts force on the apply plate 383 to move the apply plate 383 to the second clutch position to engage the plurality of clutch discs 386 such that drive torque is transferred through the mode clutch 30. In the second position, a maximum clutch engagement force can be applied to the mode clutch 30 such that the first output shaft 14 is coupled for uniform rotation with the second output shaft 16 to establish a non-differentiated drive mode. It should be recognized by those skilled in the art, that variations in assembling a multiple plate mode clutch including clutch friction discs are contemplated to be within the spirit and scope of the present invention. Any clutch actuator assembly having an axially movable apply plate driven axially by a concentric gear interposed coaxially between a range shift mechanism 360 and mode clutch 30 through a clutch actuator 388 to establish power transmission between first and second output shafts 14, 16 is considered to be within the scope of the present invention.

Figure 10:
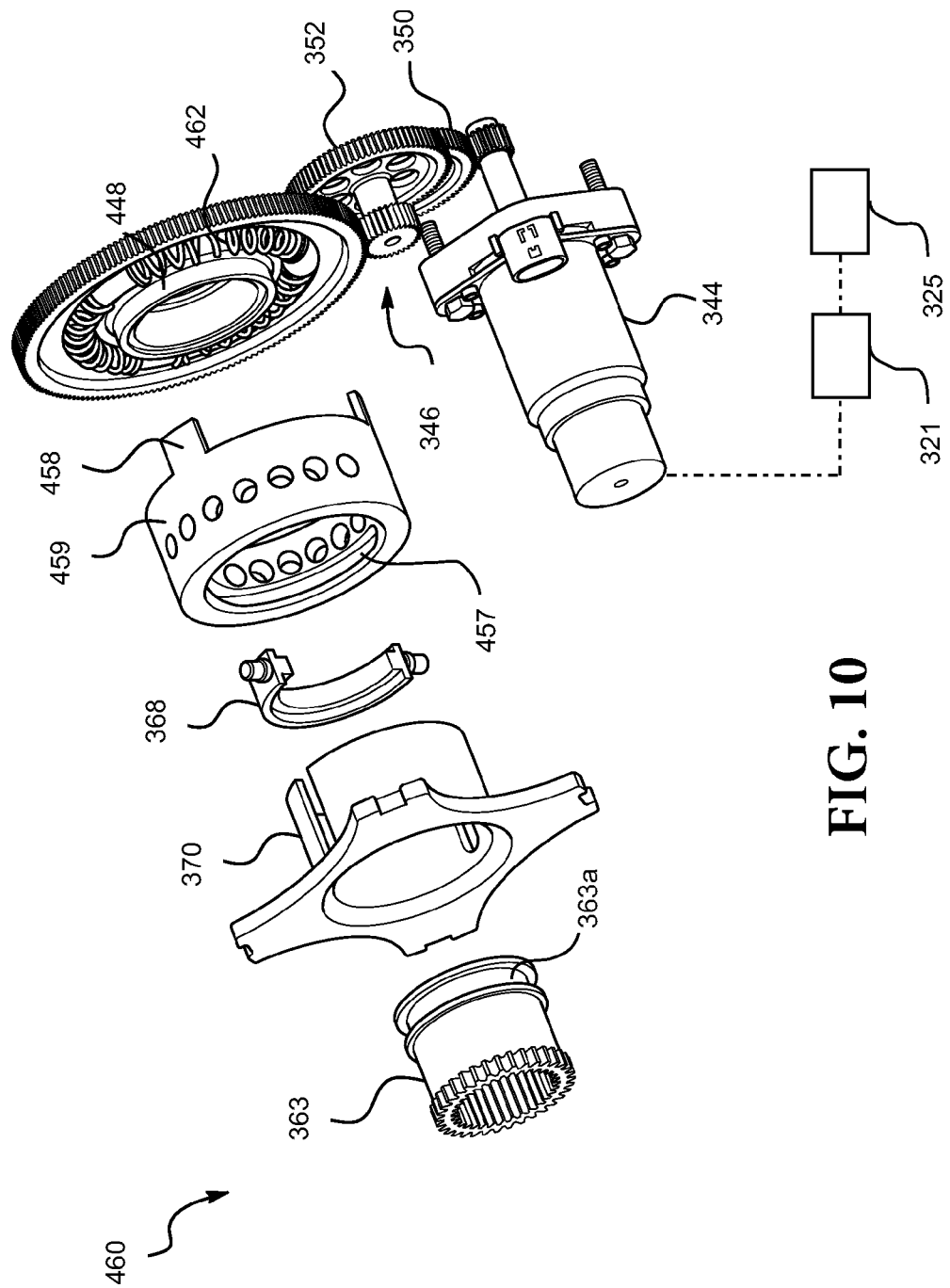
FIG. 10 is an exploded view of the range shift mechanism having a plurality of springs engageable between the barrel cam and the actuating gear for biasing the barrel cam to follow rotation of the actuating gear, and a plurality of cam tabs located on the barrel cam engageable with a plurality of slots defined by the actuating gear.
Figure 13B:
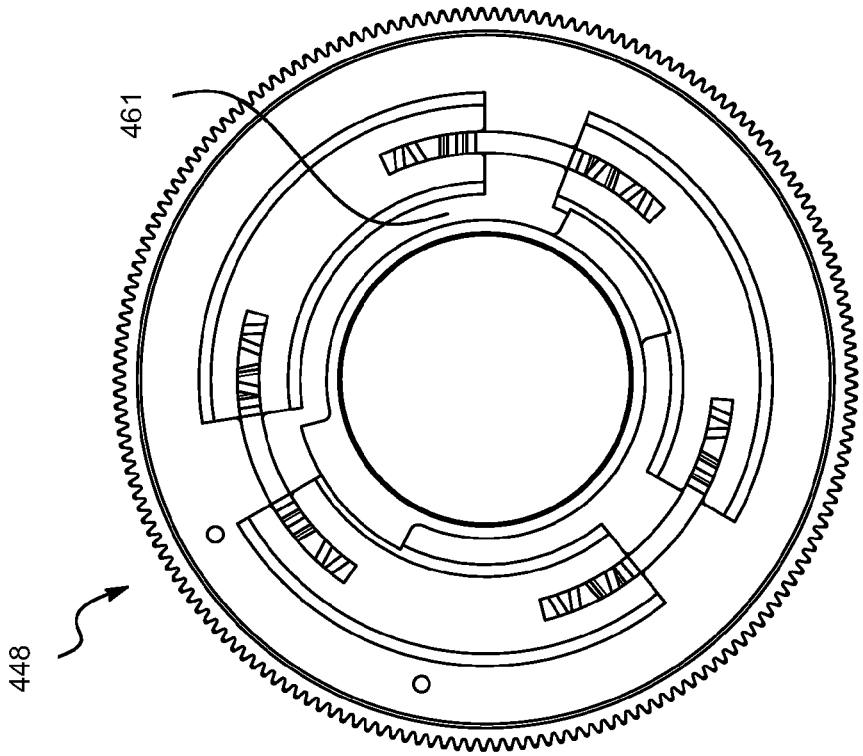
FIG. 13B is a schematic showing the mode shift mechanism actuating side of the actuating gear.
Figure 13A:
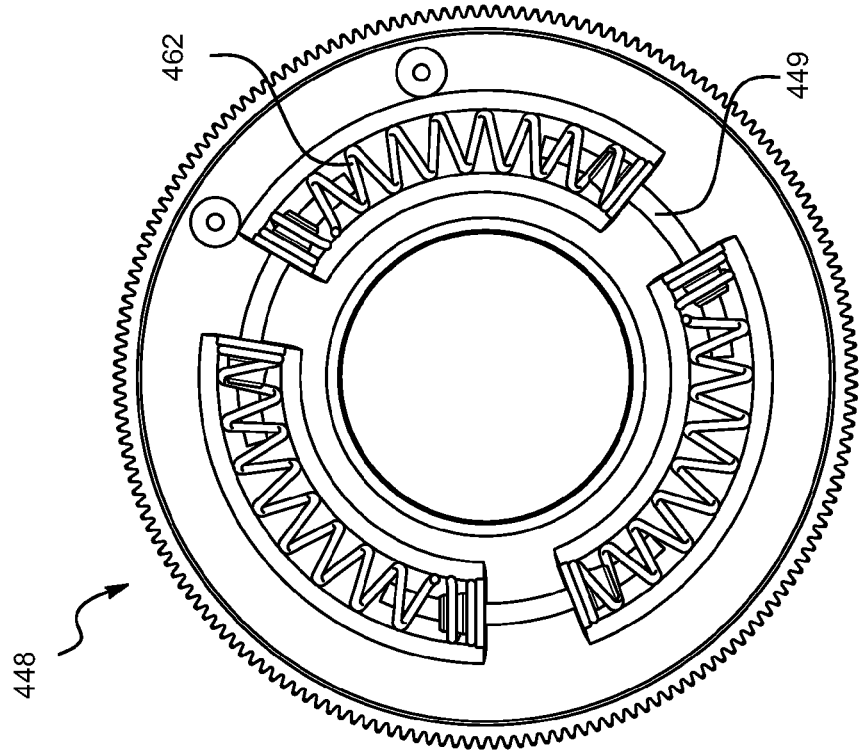
FIG. 13A is a schematic showing the range shift mechanism actuating side of the actuating gear.

Referring now to FIGS. 10-13B, the electro-mechanical transfer case 310 can include the actuating gear 448 located coaxial with the common primary axis and interposed between the range shift mechanism 460 and mode shift mechanism 480, such that one face of the actuating gear 448 operatively engages and operates the range shift mechanism 460 during a portion of angular rotation about the common primary axis, while the opposite face of the actuating gear 448 operatively engages and operates the mode shift mechanism 480 during a mutually exclusive portion of angular rotation about the common primary axis. As best illustrated in FIGS. 12-13A, the actuating gear 448 can define a plurality of elongated barrel-cam-engaging arcuate slots 449 for engagement with a plurality of cam tabs 458 located on the barrel cam 459. The actuating gear 448 can further define a spring recess 464 located between each of the plurality of slots 449 for receiving a plurality of springs 462. As best illustrated in FIG. 10, the plurality of springs 462 can be engageable with the barrel cam 459 for actuation of the range shift mechanism 460. As best illustrated in FIG. 12, the barrel cam 459 can include a cam surface groove 457 extending circumferentially and axially along an interior surface of the barrel cam 459 to define an axial range shift movement in response to rotation of the barrel cam 459, and a plurality of axially extending cam tabs 458 operably engageable with a corresponding plurality of elongated barrel-cam-engaging arcuate slots 449 defined by the actuating gear 448. The actuating gear 448 can include a plurality of arcuate springs 462 extending along an angular portion of the actuating gear 448 and engageable between the cam tabs 458 of the barrel cam 459 and the actuating gear 448 for biasing the barrel cam 459 to follow rotational movement of the actuating gear 448, if completion of range shift movement is temporarily blocked due to unmeshed gear teeth engagement during axial movement. The plurality of arcuate springs 462 are constrained to follow movement of the actuating gear 448 and can be compressed in either rotational direction of the actuating gear 448 in response to failure of the barrel cam 459 to follow rotational movement of the actuating gear 448. When compressed, the plurality of arcuate springs 462 continually bias the barrel cam 459 in the desired direction of movement until the range shift movement is completed. The shift fork 368 can be driven to move in guided travel along the cam surface groove in an axial direction in response to rotation of the barrel cam 459 by the actuating gear 448 to actuate the range shift function between a low-range drive mode and a high range drive mode of operation. The shift fork 368 can be operably engageable with the barrel cam 459 through the shift collar 370. In other words, the barrel cam 459 can be fixed to the actuating gear 448 when the plurality of cam tabs 458 are engaged within the plurality of barrel-cam engaging slots 449. The barrel cam 459 can be rotatably biased by the plurality of springs 462 even if axial movement is temporarily blocked, while the actuating gear 448 continues to rotate. When the barrel cam 459 is axially blocked during rotation, the plurality of springs 462 can loaded with rotational energy to bias the barrel cam 459 to move into a desired orientation. The plurality of springs 462 can provide a coupling between the actuating gear 448 and the barrel cam 459. The plurality of springs 462 can store energy between the electric motor 344 and the shift fork 368 until the desired range mode shift is completed.

As illustrated in FIG. 10, the actuating gear 448 can actuate the range shift mechanism 460 through a face of the actuating gear 448 facing the range shift mechanism 460. The intermediate output gear 352 can rotate the actuating gear 448. The actuating device 32 can include a barrel cam 459 having a cam surface groove 457 extending circumferentially and axially along an interior surface of the barrel cam 459 to define an axial range shift movement in response to rotation of the barrel cam 459, and a plurality of axially extending cam tabs 458 operably engageable with a corresponding plurality of elongated barrel-cam-engaging arcuate slots 449 defined by the actuating gear 448. The shift fork 368 can travel along the cam surface groove 457 to shift the range shift mechanism 460 between a low-range drive mode position and a high-range drive mode position. The barrel cam 459 can be rotatable around the common primary axis in response to rotation of the actuating gear 448. The shift collar 370 can be engageable with the shift fork 368 during the travel of the shift fork 368 within the cam surface groove 457 of the barrel cam 459. The shift fork 368 can act as a cam follower traveling within the cam surface groove 457 of the barrel cam 459. The shift fork 368, barrel cam 459, and shift collar 370 can surround an axially moveable range sleeve 363. The shift collar 370 is a cylindrical element that can be coupled to the shift fork 368 to allow axial movement of the shift fork 368, while preventing rotational movement of the shift fork 368. The shift collar 370 allows the shift fork 368 to slide in an axial direction to drive the range sleeve 363 in response to shifting rotational movement of the barrel cam 459 between a low-range angular position and a high-range angular position. As previously described, the range sleeve 363 can be engageable with the planetary gear assembly 20 through the synchronizer for transferring rotation from the planetary gear assembly 20 to the first output shaft 14 through a splined connection allowing axial movement of the range sleeve 363 with respect to the first output shaft 14.

As illustrated in FIG. 11, the actuating gear 448 can also actuate the mode shift mechanism 480 through a face of the actuating gear 448 opposite from the range shift mechanism 460. The input gear 350 can rotate the intermediate output gear 352 which can engage the input gear 350 and the actuating gear 448. The intermediate output gear 352 can rotate the actuating gear 448. As best illustrated in FIG. 13B, the actuating gear 448 can actuate the mode shift mechanism 480 through a plurality of elongated arcuate pocket slots 461 defined by the actuating gear 448. The plurality of elongated arcuate pockets slots 461 can be located adjacent to and radially spaced inwardly from, while being angularly overlapping with respect to, the plurality of elongated barrel-cam-engaging arcuate slots 449 on the opposite side of the actuating gear 448 as best seen comparing FIGS. 13A-B. The plurality of elongated arcuate pocket slots 461 are located on the face of the actuating gear 448 opposite from the face engaged with the plurality of springs 462. The plurality of elongated arcuate pocket slots 461 can be located adjacent to and radially spaced inwardly from, while being angular overlapping with respect to the spring recesses 464 on the opposite face of the actuating gear 448. The cam surface groove 457 of the barrel cam 459 can include a period of dwell 457a, 457b on either end of the axial travel of the shift fork 368 within the cam surface groove 457 as best seen in FIG. 7. When the shift fork 368 is in the period of dwell, the shift fork 368, acting as a cam follower, is axially stationary even though the barrel cam 459 can be rotating in response to rotation of the actuating gear 448. When the shift fork 368 is in the range shift portion 457c of the cam surface groove 457 and rotation of the barrel cam 459 is blocked due to axial movement of the range sleeve 363 being blocked until proper intermeshing teeth alignment is achieved to complete the requested range mode shift, the plurality of springs 462 can act to receive the load allowing the actuating gear 448 to continue to rotate. When the shift fork 368 is in the period of dwell 457a, 457b, the mode shift mechanism 480 can be actuated through the plurality of elongated arcuate pocket slots 461, which can only operate the mode shift mechanism 480 when the shift fork 368 is in the dwell period 457a, 457b of the cam surface groove 457.

The mode shift mechanism 480 can include a clutch actuator 488 located on a side of the actuating gear 448 opposite from the range shift mechanism 460. The clutch actuator 488 can include a plurality of clutch-actuating tabs 489 for engagement within the plurality of elongated arcuate pocket slots 461. When the shift fork 368 is in a period of dwell 457a, 457b of the cam surface groove 457, while in either a high-range drive mode or a low-range drive mode, the plurality of clutch-actuating tabs 489 are engaged within the plurality of elongated arcuate pocket slots 461 for actuating the components of the mode shift mechanism 480 in response to rotational movement of the actuating gear 448. The clutch actuator 488 can be located radially and axially within an annular ridge or ring 454. The annular ridge or ring 454 defines an annular housing for supporting and encloses the plurality of springs 462 on the opposite face of the actuating gear 448. The clutch actuator 488 can define a plurality of elongate arcuate recesses 490 having a deep central portion tapering to shallow outer ends 494. The plurality of elongate arcuate recesses 490 can receive a corresponding plurality of rolling members 492 with one rolling member 492 per recess 490. An axially movable intermediate plate 478 can be positioned to trap the plurality of rolling members 492 interposed between the clutch actuator 488 and the intermediate plate 478. The intermediate plate 478 can be axially moveable along the common primary axis in response to movement of the rolling member 492 along the corresponding elongated arcuate recess toward one of the tapered outer ends causing a distance between the clutch actuator 488 and the intermediate plate 478 to increase. The intermediate plate 478 can shift the mode clutch 30 between a first axial clutch position and a second axial clutch position. The intermediate plate 478 can include a plurality of pins 496 located on an exterior peripheral surface portion 498 of the intermediate plate 478. The plurality of pins 496 can be engageable within the annular ridge or ring 454 of the actuating gear 448 to allow axial shifting movement of the intermediate plate 478 with respect to the actuating gear 448, and providing free floating support for the intermediate plate 478 while preventing transfer of rotational movement from the concentric gear to the intermediate plate 478. The mode shift mechanism 480 can also include a plurality of rolling members 492 to be received within the elongated arcuate recess 490 of the clutch actuator 488. The plurality of rolling members 492 can be located within corresponding elongated arcuate recesses for operable engagement with the intermediate plate 478. In response to rotational movement of the actuating gear 448, each of the plurality of rolling members 492 slide or roll to an outer shallower end portion 494 of the corresponding elongated arcuate recess 490 causing axial movement of the intermediate plate 478 away from the actuating gear 448 and toward a drive gear 38. When the range shift mechanism 460 is in either a low-range drive mode or a high-range of drive mode and the mode shift mechanism 480 is actuated, the actuating gear 448 can rotate such that the plurality of rolling members 492 can move within the tapering recess 490 of the clutch actuator 488 to actuate the mode shift mechanism 480. Depending on the clutch assembly design, the clutch actuator can operate to drive the pressure plate 484 between first and second axial positions to apply and release the clutch as the rolling members 492 move between the deeper central portion of the recesses 490 and the outer tapering shallower end portions 494 of the recesses 490.

As best illustrated in FIG. 11, the mode shift mechanism 480 can further include a ring member 483, a pressure plate 484, a diaphragm spring 485, a clutch friction disc 486, a clutch housing 82, and a drive gear 38. The drive gear 38 can be rotatable around the primary axis and can drive the second output shaft 16. The pressure plate 484 can be located along the common primary axis to be fixed for rotation with respect to the drive gear 38, while being axially moveable with respect to the drive gear 38. The pressure plate 484 can be axially moveable between a first clutch position and a second clutch position. When the plurality of rolling members 492 are located within the deeper central portion of the recesses 490 of the clutch actuator 488, the pressure plate 484 can be located in a second position or released position to disengage the drive gear 38 causing no drive torque to be transferred through the mode shift mechanism 480 to the second output shaft 16. When the plurality of rolling members 492 are positioned in an elevated shallower outer end portion 494 of the tapering recesses 490, the intermediate plate 478 is moved axially to exert force on the ring member 483 which can engage and force the pressure plate 484 into first axial position or locked position with the clutch friction disc 486 in order to transfer drive torque to the second output shaft 16. In the first position, a maximum clutch engagement force can be applied to the mode shift mechanism 480 such that the first output shaft 14 is coupled for uniform rotation with the second output shaft 16 to establish a non-differentiated drive mode. The diaphragm spring 485 and clutch friction disc 486 can be located along the common primary axis for axial movement in response to axial movement of the pressure plate 484.

A transfer case 21, 310 can be assembled for a four-wheel drive vehicle having an input shaft 15 rotatably driven by an engine and located along a longitudinal axis, a first output shaft 14, and a second output shaft 16 corresponding to a front driveline and a rear driveline. The first output shaft 14 can be located along the longitudinal axis. The transfer case 21, 310 can include a planetary gear assembly 20 for changing a drive ratio between the input shaft 15 and the first output shaft 14 and a mode clutch 30 located along the longitudinal axis for selectively shifting between a two-wheel drive mode and a four-wheel drive mode, the planetary gear assembly 20 can have a sun gear fixed to the input shaft 15, a ring gear 24, and a planetary gear carrier 26 supporting a plurality of planetary gear 28 intermeshed between the sun gear 22 and the ring gear 24. The method of assembling can include inserting a range shift mechanism 50, 360, 460, fixedly mounting a ring gear 24, mounting a synchronizer 40, 340, and inserting a mode shift mechanism 56, 380, 480. The range shift mechanism 50 can shift the transfer case 21 between a high-range drive mode and a low-range drive mode such that the first output shaft 14 can be driven by the sun gear 22 during the high-range drive mode and driven by the planetary gear carrier 26 during the low-range drive mode. The ring gear 24 can be mounted in a fixed stationary position with respect to the planetary gear assembly 20 such that the ring gear 24 is fixed during the high-range drive mode and the low-range drive mode. The synchronizer 40, 340 can be mounted to the first output shaft 14 and adjacent the planetary gear assembly 20 along the longitudinal axis for providing speed synchronization of rotating input and rotating output components before drivingly connecting the first output shaft 14 with the sun gear 22 during the high-range drive mode and with the planetary gear carrier 26 during the low-range drive mode. The mode shift mechanism 56, 380, 480 can be located adjacent the range shift mechanism 50, 360, 460 and axially moveable for engaging and disengaging the mode clutch 30. The method can further include inserting a clutch actuator 388, 488 movable between an expanded position and a contracted position engageable with the mode clutch 30. The method can further include connecting an actuating gear 348, 448 axially interposed between the range shift mechanism 360, 460 and the mode shift mechanism 380, 480. The actuating gear 348, 448 can be reversibly rotatable through a predetermined angular arc of movement for operating the clutch actuator 388, 488 between the contracted position and the expanded position for actuating the mode clutch 30 between a disengaged position and an engaged position, and for shifting the range shift mechanism 360, 460 between the low-range drive mode and the high-range drive mode when the mode clutch 30 is in the disengaged position. The method can further include connecting a barrel cam 359, 459 for rotation in response to rotation of the actuating gear 348, 448 and defining a cam surface groove 357, 457. The cam surface groove can have end portions and an intermediate portion extending between the end portions, such that each end portion corresponds to one of the low-range drive mode and the high-range drive mode and allows actuation of the clutch actuator 388, 488 while in one of the low-range drive mode and the high-range drive mode.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a transfer case (21, 310) for a four-wheel drive vehicle having an input shaft (15) and a first output shaft (14) located along a common longitudinal axis, a second output shaft (16), a mode clutch (30) located along the longitudinal axis for selectively shifting between a two-wheel drive mode and a four-wheel drive mode, and a planetary gear assembly (20) for providing a different drive ratio between the input shaft (15) and the first output shaft (14), the planetary gear assembly (20) having a sun gear (22) fixed to the input shaft (15), a ring gear (24), and a planetary gear carrier (26) supporting a plurality of planetary gears (28) intermeshed between the sun gear (22) and the ring gear (24), the improvement comprising:

a range shift mechanism (50, 360, 460) for shifting between a high-range drive mode and a low-range drive mode, the first output shaft (14) driven by the sun gear (22) during the high-range drive mode and driven by the planetary gear carrier (26) during the low-range drive mode, the ring gear (24) grounded against rotation during the high-range drive mode and the low-range drive mode;

and a mode shift mechanism (56, 380, 480) located adjacent the range shift mechanism (50, 360, 460) along the longitudinal axis and axially moveable for engaging and disengaging the mode clutch (30), the mode shift mechanism (56) including a mode hub (42) coupled to the first output shaft (14), an internal mode sleeve (54) axially moveable and splined for engagement with the mode clutch (30) through a clutch housing (82), a power transmission member (36) having a drive gear (38) coupled to the first output shaft (14) for transmitting rotary power to a driven sprocket (44) coupled to the second output shaft (16), and a clutch actuator (76) engageable with the mode hub (42) for movement of the internal mode sleeve (54).

2. The improvement of claim 1 further comprising:
a synchronizer (40, 340) connected to the first output shaft (14) and located adjacent the planetary gear assembly (20) along the longitudinal axis, the synchronizer (40, 340) for synchronizing speed of the input shaft (15) and the first output shaft (14) before drivingly connecting the first output shaft (14) with the sun gear (22) during the high-range drive mode and with the planetary gear carrier (26) during the low-range drive mode.

3. The improvement of claim 2, wherein the synchronizer (40) further comprises:
a first synchronizer assembly (66) having a first blocker ring (90) preventing driving connection between a first member (114) connected to the sun gear (22) and the first output shaft (14) during the high-range drive mode until the sun gear (22) and the first output shaft (14) are rotating at an approximately common speed; and
a second synchronizer assembly (68) having a second blocker ring (290) preventing driving connection between a second member (214) connected to the planetary gear carrier (26) and the first output shaft (14) during the low-range drive mode until the planetary gear carrier (26) and the first output shaft (14) are rotating at an approximately common speed.

4. The improvement of claim 3, wherein the range shift mechanism (50) further comprises:
a synchronizer hub (70) interposed between the first and second synchronizer assemblies (66, 68), the synchronizer hub (70) coupled to the first output shaft (14) and having an outer spline surface (120);
a shift sleeve (52) moveable along the longitudinal axis engageable with the first and second synchronizer assemblies (66, 68), the shift sleeve (52) having a diameter greater than a diameter of the synchronizer hub (70) and an inner spline surface (118) engageable with the outer spline surface (120) and external teeth (90b, 290b) located on the first and second blocker rings (90, 290);
a shift fork (58) for axially moving the shift sleeve (52) along the longitudinal axis engageable with the first and second synchronizer assemblies (66, 68); and
a shift actuator (74) for actuating the shift fork (58).

5. The improvement of claim 4, wherein the synchronizer hub (70) further comprises:
the synchronizer hub (70) having a plurality of recesses (122) equally spaced concentrically about the synchronizer hub (70); and
a plurality of struts (84) received within the corresponding plurality of recesses (122) formed in the synchronizer hub (70), the plurality of struts (84) having splined surfaces (128) engageable with the inner spline surface (118) of the shift sleeve (52) and normally biased radially inward toward the longitudinal axis, the plurality of struts (84) shifted radially within the plurality of recesses (122) during axial movement of the shift sleeve (52).

6. The improvement of claim 3, wherein each of the first and second synchronizer assemblies (66, 68) further comprises:
a cone shaped body (92, 292) having a first cone surface (92a, 292a);
an inner cone ring (94, 294) having a second cone surface (100, 200);
an outer cone ring (96, 296) having a first blocking surface (104, 204) engageable with the first cone surface (92a, 292a) and a second blocking surface (106, 206) engageable with second cone surface (100, 200); and
each of the first and second blocker rings (90, 290) having a third cone surface (102, 202), the inner cone ring (94, 294) having a third blocking surface (108, 208) engageable with the third cone surface (102, 202).

7. In a transfer case (21, 310) for a four-wheel drive vehicle having an input shaft (15) and a first output shaft (14) located along a common longitudinal axis, a second output shaft (16), a mode clutch (30) located along the longitudinal axis for selectively shifting between a two-wheel drive mode and a four-wheel drive mode, and a planetary gear assembly (20) for providing a different drive ratio between the input shaft (15) and the first output shaft (14), the planetary gear assembly (20) having a sun gear (22) fixed to the input shaft (15), a ring gear (24), and a planetary gear carrier (26) supporting a plurality of planetary gears (28) intermeshed between the sun gear (22) and the ring gear (24), the improvement comprising:

a range shift mechanism (50, 360, 460) for shifting between a high-range drive mode and a low-range drive mode, the first output shaft (14) driven by the sun gear (22) during the high-range drive mode and driven by the planetary gear carrier (26) during the low-range drive mode, the ring gear (24) grounded against rotation during the high-range drive mode and the low-range drive mode;

a mode shift mechanism (56, 380, 480) located adjacent the range shift mechanism (50, 360, 460) along the longitudinal axis and axially moveable for engaging and disengaging the mode clutch (30);

a clutch actuator (388, 488) moveable between an expanded position and a contracted position engageable with the mode clutch (30);

an actuating gear (348, 448) axially interposed between the range shift mechanism (360, 460) and the mode shift mechanism (380, 480), the actuating gear (348, 448) reversibly rotatable through a predetermined angular arc of movement for operating the clutch actuator (388, 488) between the contracted position and the expanded position for actuating the mode clutch (30) between a disengaged position and an engaged position, and for shifting the range shift mechanism (360, 460) between the low-range drive mode and the high-range drive mode when the mode clutch (30) is in the disengaged position; and a barrel cam (359, 459) connected for rotation in response to rotation of the actuating gear (348, 448) defining a cam surface groove (357, 457), the cam surface groove having end portions and an intermediate portion extending between the end portions, each end portion corresponding to one of the low-range drive mode and the high-range drive mode and allowing actuation of the clutch actuator (388, 488) while in one of the low-range drive mode and the high-range drive mode.

8. The improvement of claim 7 further comprising:

a synchronizer (40, 340) connected to the first output shaft (14) and located adjacent the planetary gear assembly (20) along the longitudinal axis, the synchronizer (40, 340) for synchronizing speed of the input shaft (15) and the first output shaft (14) before drivingly connecting the first output shaft (14) with the sun gear (22) during the high-range drive mode and with the planetary gear carrier (26) during the low-range drive mode.

9. The improvement of claim 8, wherein the range shift mechanism (360, 460) further comprises:

at least one spring (362, 462) engageable between the barrel cam (359, 459) and the actuating gear (348, 448) for biasing the barrel cam (359, 459) to follow reversible rotational movement of the actuating gear (348, 448);

a shift fork (368) for guided travel along the cam surface groove (357, 457) of the barrel cam (359, 459) in response to rotation of the barrel cam (359, 459) by the actuating gear (348, 448) to shift between the low-range drive mode and the high-range drive mode;

a shift collar (370) defining an axial groove (371) and for supporting the shift fork (368) to allow axial movement of the shift fork (368) while restricting rotation of the shift fork (368); and a range sleeve (363) supported for rotation with respect to the shift fork (368) while being driven in axial movement in response to axial movement of the shift fork (368) with respect to the shift collar (370) in response to rotation of the barrel cam (359, 459) with respect to the shift collar (370), the range sleeve (363) connected for driving rotation of the first output shaft (14) through the synchronizer (340).

10. The improvement of claim 9, wherein the synchronizer (340) further comprises:

a transmitter connected to a flange (364) of the range sleeve (363) extending radially outwardly with respect to the longitudinal axis, the transmitter having an external splined surface (342a, 342b) and axially moveable for transferring torque from the input shaft (15) to the first output shaft (14) through the planetary gear carrier (26) in the low-range drive mode and through the sun gear (22) in the high-range drive mode;

a first gear (345a) mounted to the longitudinal axis and adjacent the transmitter, the first gear (345a) connected to the planetary gear carrier (26) and having an internal splined surface engageable with the external splined surface (342a) of the transmitter for establishing the low-range drive mode;

a second gear (345b) mounted to the longitudinal axis and adjacent the transmitter, the transmitter interposed between the first gear (345a) and the second gear (345b), the second gear (345b) connected to the sun gear (22) and having an internal splined surface engageable with the external splined surface (342b) of the transmitter for establishing the high-range drive mode;

a first synchronizer ring (349a) interposed between the transmitter and the first gear (345a), the first synchronizer ring (349a) having an internal splined surface engageable with the external splined surface (342a) of the transmitter for preventing driving connection between the transmitter and the first gear (345a) until the transmitter and the first gear (345a) are rotating at an approximately common speed in the low-range drive mode; and a second synchronizer ring (349b) interposed between the transmitter and the second gear (345b), the second synchronizer ring (349b) having an internal splined surface engageable with the external splined surface (342b) of the transmitter for preventing driving connection between the transmitter and the second gear (345b) until the transmitter and the second gear (345b) are rotating at an approximately common speed in the high-range drive mode.

11. The improvement of claim 7, wherein the clutch actuator (488) further comprises:

the clutch actuator (488) engageable with a face of the actuating gear (448) opposite from the range shift mechanism (460), the clutch actuator (488) including a plurality of clutch-actuating tabs (489) engageable with a corresponding plurality of elongated arcuate pocket slots (461) defined by the actuating gear (448), the clutch actuator (488) defining a plurality of elongated arcuate recesses (490) having a deep central portion tapering to a shallow depth at outer ends (494);

a corresponding plurality of rolling members (492), a rolling member (492) received within each of the plurality of elongated arcuate recesses (490) for movement along the elongated arcuate recess (490) between a deeper central portion of the recess (490) and a shallower outer end (494) of the recess (490); and an axially movable intermediate plate (478) trapping the plurality of rolling members (492) interposed between the intermediate plate (478) and the clutch actuator (488), the intermediate plate (478) for shifting the mode clutch between a first axial clutch position and a second axial clutch position in response to movement of the rolling member from the deeper central portion of the recess (490) to the shallower outer end (494) of the recess (490).

12. The improvement of claim 7, wherein the clutch actuator (388) further comprises:
- a clutch actuating cam (388b) rotatable in response to rotation of the actuating gear (348) and axially moveable towards the mode clutch (30) for engaging the mode clutch (30);
- a retainer (388a) supported for preventing rotation with the actuating gear (348) and axially interposed between the range shift mechanism (360) and the clutch actuating cam (388b), the retainer (388a) defining a plurality of elongated arcuate recesses (390) having a deep central portion tapering to a shallow depth at outer ends (394);
- a corresponding plurality of rolling members (392), a rolling member (392) received within each of the plurality of elongated arcuate recesses (390) for movement along the elongated arcuate recesses (390) between the deep central portion of the recess and the shallow depth at outer ends (394) of each recess, the clutch actuating cam (388b) trapping the plurality of rolling members (392) interposed between the retainer (388a) and the clutch actuating cam (388b), the clutch actuating cam (388b) angularly rotatable with respect to the retainer (388a) and axially moveable toward the mode clutch (30) for engaging the mode clutch (30) in response to movement of the rolling member (392) from the deep central portion of the recess (390) to the shallow depth at outer ends (394) of the recess; and
- a plurality of pins (396) located on a surface (398) of the clutch actuating cam (388b) for imparting angular rotation to the clutch actuating cam (388b) with respect to the retainer (388a) through the actuating gear (348), while allowing axial movement of the clutch actuating cam (388b) with respect to the retainer (388a) providing a free floating movement between the clutch actuating cam (388b) and the actuating gear (348).

13. The improvement of claim 7 further comprising:
- a reversible electric motor (344) located off axis with respect to the longitudinal axis; and
- a gear train (346) reversibly driven by the electric motor (344) for driving the actuating gear (348, 448) in rotation.

14. The improvement of claim 7 further comprising:
- at least one sensing element (323) located on a peripheral surface of the actuating gear (348) for detecting a position of the actuating gear (348); and
- an engine control unit (321) for actuating the range shift mechanism (360) and the mode shift mechanism (380) in response to a detected position of the actuating gear (348) by the at least one sensing element (323).

15. A method for assembling a transfer case (21, 310) for a four-wheel drive vehicle having an input shaft (15) rotatably driven by an engine and located along a longitudinal axis, a first output shaft (14) and a second output shaft (16) corresponding to a front driveline and a rear driveline, the first output shaft (14) located along the longitudinal axis, a planetary gear assembly (20) for changing a drive ratio between the input shaft (15) and the first output shaft (14), and a mode clutch (30) located along the longitudinal axis for selectively shifting between a two-wheel drive mode and a four-wheel drive mode, the planetary gear assembly (20) having a sun gear (22) fixed to the input shaft (15), a ring gear (24), a planetary gear carrier (26) supporting a plurality of planetary gears (28) intermeshed between the sun gear (22) and the ring gear (24), the method comprising:
- inserting a range shift mechanism (50, 360, 460) along the longitudinal axis for shifting between a high-range drive mode and a low-range drive mode, wherein the first output shaft (14) is driven by the sun gear (22) during the high-range drive mode and is driven by the planetary gear carrier (26) during the low-range drive mode;
- mounting the ring gear (24) in a fixed stationary position with respect to the planetary gear assembly (20), the ring gear (24) fixed during the high-range drive mode and the low-range drive mode;
- mounting a synchronizer (40, 340) to the first output shaft (14) and adjacent the planetary gear assembly (20) along the longitudinal axis, the synchronizer (40, 340) for synchronizing speed of the input shaft (15) and the first output shaft (14) before drivingly connecting the first output shaft (14) with the sun gear (22) during the high-range drive mode and with the planetary gear carrier (26) during the low-range drive mode; and
- inserting a mode shift mechanism (56, 380, 480) adjacent the range shift mechanism (50, 360, 460) along the longitudinal axis, the mode shift mechanism (56, 380, 480) axially moveable for engaging and disengaging the mode clutch (30).

16. The method of claim 15, wherein the mode shift mechanism (56) includes a mode hub (42) coupled to the first output shaft (14), an internal mode sleeve (54) axially moveable and splined for engagement with the mode clutch (30) through a clutch housing (82), a power transmission member (36) having a drive gear (38) coupled to the first output shaft (14) for transmitting rotary power to a driven sprocket (44) coupled to the second output shaft (16), and a clutch actuator (76) engageable with the mode hub (42) for movement of the internal mode sleeve (54).

17. The method of claim 15 further comprising:
- inserting a clutch actuator (388, 488) moveable between an expanded position and a contracted position engageable with the mode clutch (30);
- connecting an actuating gear (348, 448) axially interposed between the range shift mechanism (360, 460) and the mode shift mechanism (380, 480), the actuating gear (348, 448) reversibly rotatable through a predetermined angular arc of movement for operating the clutch actuator (388, 488) between the contracted position and the expanded position for actuating the mode clutch (30) between a disengaged position and an engaged position, and for shifting the range shift mechanism (360, 460) between the low-range drive mode and the high-range drive mode when the mode clutch (30) is in the disengaged position; and
- connecting a barrel cam (359, 459) for rotation in response to rotation of the actuating gear (348, 448), the barrel cam (359, 459) defining a cam surface groove (357, 457) having end portions and an intermediate portion extending between the end portions, each end portion corresponding to one of the low-range drive mode and the high-range drive mode and allowing actuation of the clutch actuator (388, 488) while in one of the low-range drive mode and the high-range drive mode.

* * * * *